US011939854B2

(12) United States Patent
Yeung et al.

(10) Patent No.: US 11,939,854 B2
(45) **Date of Patent: *Mar. 26, 2024**

(54) METHODS FOR DETECTION AND MITIGATION OF WELL SCREEN OUT

(71) Applicant: BJ Energy Solutions, LLC, Houston, TX (US)

(72) Inventors: Tony Yeung, Houston, TX (US); Ricardo Rodriguez-Ramon, Houston, TX (US); Joseph Foster, Houston, TX (US)

(73) Assignee: BJ Energy Solutions, LLC, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,007

(22) Filed: Nov. 21, 2022

(65) Prior Publication Data

US 2023/0086213 A1 Mar. 23, 2023

Related U.S. Application Data

(63) Continuation of application No. 17/355,920, filed on Jun. 23, 2021, now Pat. No. 11,566,506, which is a
(Continued)

(51) Int. Cl.

| | |
|---|---|
| ***E21B 43/267*** | (2006.01) |
| ***E21B 21/08*** | (2006.01) |

(Continued)

(52) U.S. Cl.

CPC ............ *E21B 43/267* (2013.01); *E21B 21/08* (2013.01); *E21B 43/12* (2013.01); *E21B 43/26* (2013.01);
(Continued)

(58) Field of Classification Search

CPC ........ E21B 43/267; E21B 21/08; E21B 43/12; E21B 43/26; E21B 43/2607; G08B 21/182
See application file for complete search history.

(56) References Cited

U.S. PATENT DOCUMENTS

| | | | |
|---|---|---|---|
| 1,716,049 | A | 6/1929 | Greve |
| 1,726,633 | A | 9/1929 | Smith |

(Continued)

FOREIGN PATENT DOCUMENTS

| | | |
|---|---|---|
| AU | 9609498 | 7/1999 |
| AU | 737970 | 9/2001 |

(Continued)

OTHER PUBLICATIONS

US 11,555,493 B2, 01/2023, Chang et al. (withdrawn)
(Continued)

*Primary Examiner* — James G Sayre
(74) *Attorney, Agent, or Firm* — Norton Rose Fulbright US LLP

(57) ABSTRACT

Methods, systems, and controllers for detecting and mitigating well screen outs may include a controller configured to operate a fracturing pump to supply fluid at a discharge rate to a wellhead at a fracturing well site. The controller may also operate a blender positioned to deliver a blend of proppant and fluid to the fracturing pump. The controller may compare a fluid pressure increase rate to a preselected increase rate indicative of a potential well screen out. The controller may incrementally decrease the discharge rate of the fracturing pump and a flow rate of a blender when the fluid pressure increase rate of the wellhead exceeds the preselected increase rate and the fluid pressure is within a
(Continued)

preselected percentage of a maximum wellhead pressure until the fluid pressure of the fluid supplied to the wellhead is stabilized.

22 Claims, 3 Drawing Sheets

Related U.S. Application Data continuation of application No. 17/303,841, filed on Jun. 9, 2021, now Pat. No. 11,208,881, which is a continuation of application No. 17/182,408, filed on Feb. 23, 2021, now Pat. No. 11,066,915.

(60) Provisional application No. 62/705,050, filed on Jun. 9, 2020.

(51) Int. Cl.
*E21B 43/12* (2006.01)
*E21B 43/26* (2006.01)
*G08B 21/18* (2006.01)

(52) U.S. Cl.
CPC ........ *E21B 43/2607* (2020.05); *G08B 21/182* (2013.01)

(56) References Cited

U.S. PATENT DOCUMENTS

| | | | |
|---|---|---|---|
| 2,178,662 | A | 11/1939 | Lars |
| 2,427,638 | A | 9/1947 | Vilter |
| 2,498,229 | A | 2/1950 | Adler |
| 2,535,703 | A | 12/1950 | Smith et al. |
| 2,572,711 | A | 10/1951 | Fischer |
| 2,820,341 | A | 1/1958 | Amann |
| 2,868,004 | A | 1/1959 | Runde |
| 2,940,377 | A | 6/1960 | Darnell et al. |
| 2,947,141 | A | 8/1960 | Russ |
| 2,956,738 | A | 10/1960 | Rosenschold |
| 3,068,796 | A | 12/1962 | Pfluger et al. |
| 3,191,517 | A | 6/1965 | Solzman |
| 3,257,031 | A | 6/1966 | Dietz |
| 3,274,768 | A | 9/1966 | Klein |
| 3,378,074 | A | 4/1968 | Kiel |
| 3,382,671 | A | 5/1968 | Ehni, III |
| 3,401,873 | A | 9/1968 | Privon |
| 3,463,612 | A | 8/1969 | Whitsel |
| 3,496,880 | A | 2/1970 | Wolff |
| 3,550,696 | A | 12/1970 | Kenneday |
| 3,560,053 | A | 2/1971 | Ortloff |
| 3,586,459 | A | 6/1971 | Zerlauth |
| 3,632,222 | A | 1/1972 | Cronstedt |
| 3,656,582 | A | 4/1972 | Alcock |
| 3,667,868 | A | 6/1972 | Brunner |
| 3,692,434 | A | 9/1972 | Schnear |
| 3,739,872 | A | 6/1973 | McNair |
| 3,757,581 | A | 9/1973 | Mankin |
| 3,759,063 | A | 9/1973 | Bendall |
| 3,765,173 | A | 10/1973 | Harris |
| 3,771,916 | A | 11/1973 | Flanigan et al. |
| 3,773,438 | A | 11/1973 | Hall et al. |
| 3,781,135 | A | 12/1973 | Nickell |
| 3,786,835 | A | 1/1974 | Finger |
| 3,791,682 | A | 2/1974 | Mitchell |
| 3,796,045 | A | 3/1974 | Foster |
| 3,814,549 | A | 6/1974 | Cronstedt |
| 3,820,922 | A | 6/1974 | Buse et al. |
| 3,847,511 | A | 11/1974 | Cole |
| 3,866,108 | A | 2/1975 | Yannone |
| 3,875,380 | A | 4/1975 | Rankin |
| 3,963,372 | A | 6/1976 | McLain et al. |
| 4,010,613 | A | 3/1977 | McInerney |
| 4,019,477 | A | 4/1977 | Overton |
| 4,031,407 | A | 6/1977 | Reed |
| 4,047,569 | A | 9/1977 | Tagirov et al. |
| 4,050,862 | A | 9/1977 | Buse |
| 4,059,045 | A | 11/1977 | McClain |
| 4,086,976 | A | 5/1978 | Holm et al. |
| 4,117,342 | A | 9/1978 | Melley, Jr. |
| 4,173,121 | A | 11/1979 | Yu |
| 4,204,808 | A | 5/1980 | Reese et al. |
| 4,209,079 | A | 6/1980 | Marchal et al. |
| 4,209,979 | A | 7/1980 | Woodhouse et al. |
| 4,222,229 | A | 9/1980 | Uram |
| 4,239,396 | A | 12/1980 | Arribau et al. |
| 4,269,569 | A | 5/1981 | Hoover |
| 4,311,395 | A | 1/1982 | Douthitt et al. |
| 4,330,237 | A | 5/1982 | Battah |
| 4,341,508 | A | 7/1982 | Rambin, Jr. |
| 4,357,027 | A | 11/1982 | Zeitlow |
| 4,383,478 | A | 5/1983 | Jones |
| 4,402,504 | A | 9/1983 | Christian |
| 4,430,047 | A | 2/1984 | Ilg |
| 4,442,665 | A | 4/1984 | Fick |
| 4,457,325 | A | 7/1984 | Green |
| 4,470,771 | A | 9/1984 | Hall et al. |
| 4,483,684 | A | 11/1984 | Black |
| 4,505,650 | A | 3/1985 | Hannett et al. |
| 4,574,880 | A | 3/1986 | Handke |
| 4,584,654 | A | 4/1986 | Crane |
| 4,620,330 | A | 11/1986 | Izzi, Sr. |
| 4,672,813 | A | 6/1987 | David |
| 4,754,607 | A | 7/1988 | Mackay |
| 4,782,244 | A | 11/1988 | Wakimoto |
| 4,796,777 | A | 1/1989 | Keller |
| 4,869,209 | A | 9/1989 | Young |
| 4,913,625 | A | 4/1990 | Gerlowski |
| 4,983,259 | A | 1/1991 | Duncan |
| 4,990,058 | A | 2/1991 | Eslinger |
| 5,032,065 | A | 7/1991 | Yamamuro |
| 5,135,361 | A | 8/1992 | Dion |
| 5,167,493 | A | 12/1992 | Kobari |
| 5,245,970 | A | 9/1993 | Iwaszkiewicz et al. |
| 5,275,041 | A | 1/1994 | Poulsen |
| 5,291,842 | A | 3/1994 | Sallstrom et al. |
| 5,326,231 | A | 7/1994 | Pandeya |
| 5,362,219 | A | 11/1994 | Paul et al. |
| 5,482,116 | A | 1/1996 | El-Rabaa et al. |
| 5,511,956 | A | 4/1996 | Hasegawa |
| 5,517,854 | A | 5/1996 | Plumb et al. |
| 5,537,813 | A | 7/1996 | Davis et al. |
| 5,553,514 | A | 9/1996 | Walkowc |
| 5,560,195 | A | 10/1996 | Anderson et al. |
| 5,586,444 | A | 12/1996 | Fung |
| 5,622,245 | A | 4/1997 | Reik |
| 5,626,103 | A | 5/1997 | Haws et al. |
| 5,634,777 | A | 6/1997 | Albertin |
| 5,651,400 | A | 7/1997 | Corts et al. |
| 5,678,460 | A | 10/1997 | Walkowc |
| 5,717,172 | A | 2/1998 | Griffin, Jr. et al. |
| 5,720,598 | A | 2/1998 | de Chizzelle |
| 5,761,084 | A | 6/1998 | Edwards |
| 5,811,676 | A | 9/1998 | Spalding et al. |
| 5,839,888 | A | 11/1998 | Harrison |
| 5,846,062 | A | 12/1998 | Yanagisawa et al. |
| 5,875,744 | A | 3/1999 | Vallejos |
| 5,983,962 | A | 11/1999 | Gerardot |
| 5,992,944 | A | 11/1999 | Hara |
| 6,041,856 | A | 3/2000 | Thrasher et al. |
| 6,050,080 | A | 4/2000 | Horner |
| 6,067,962 | A | 5/2000 | Bartley et al. |
| 6,071,188 | A | 6/2000 | O'Neill et al. |
| 6,074,170 | A | 6/2000 | Bert et al. |
| 6,123,751 | A | 9/2000 | Nelson et al. |
| 6,129,335 | A | 10/2000 | Yokogi |
| 6,145,318 | A | 11/2000 | Kaplan et al. |
| 6,230,481 | B1 | 5/2001 | Jahr |
| 6,279,309 | B1 | 8/2001 | Lawlor, II et al. |
| 6,321,860 | B1 | 11/2001 | Reddoch |
| 6,334,746 | B1 | 1/2002 | Nguyen et al. |
| 6,367,548 | B1 | 4/2002 | Purvis et al. |
| 6,401,472 | B2 | 6/2002 | Pollrich |
| 6,530,224 | B1 | 3/2003 | Conchieri |

(56) References Cited

U.S. PATENT DOCUMENTS 6,543,395 B2 4/2003 Green
6,644,844 B2 11/2003 Neal et al.
6,655,922 B1 12/2003 Flek
6,669,453 B1 12/2003 Breeden
6,765,304 B2 7/2004 Baten et al.
6,786,051 B2 9/2004 Kristich et al.
6,832,900 B2 12/2004 Leu
6,851,514 B2 2/2005 Han et al.
6,859,740 B2 2/2005 Stephenson et al.
6,901,735 B2 6/2005 Lohn
6,935,424 B2 8/2005 Lehman et al.
6,962,057 B2 11/2005 Kurokawa et al.
7,007,966 B2 3/2006 Campion
7,047,747 B2 5/2006 Tanaka
7,065,953 B1 6/2006 Kopko
7,143,016 B1 11/2006 Discenzo et al.
7,222,015 B2 5/2007 Davis et al.
7,281,519 B2 10/2007 Schroeder
7,388,303 B2 6/2008 Seiver
7,404,294 B2 7/2008 Sundin
7,442,239 B2 10/2008 Armstrong et al.
7,516,793 B2 4/2009 Dykstra
7,524,173 B2 4/2009 Cummins
7,545,130 B2 6/2009 Latham
7,552,903 B2 6/2009 Dunn et al.
7,563,076 B2 7/2009 Brunet et al.
7,563,413 B2 7/2009 Naets et al.
7,574,325 B2 8/2009 Dykstra
7,581,379 B2 9/2009 Yoshida et al.
7,594,424 B2 9/2009 Fazekas
7,614,239 B2 11/2009 Herzog et al.
7,627,416 B2 12/2009 Batenburg et al.
7,677,316 B2 3/2010 Butler et al.
7,721,521 B2 5/2010 Kunkle et al.
7,730,711 B2 6/2010 Kunkle et al.
7,779,961 B2 8/2010 Matte
7,789,452 B2 9/2010 Dempsey et al.
7,836,949 B2 11/2010 Dykstra
7,841,394 B2 11/2010 McNeel et al.
7,845,413 B2 12/2010 Shampine et al.
7,861,679 B2 1/2011 Lemke et al.
7,886,702 B2 2/2011 Jerrell et al.
7,900,724 B2 3/2011 Promersberger et al.
7,921,914 B2 4/2011 Bruins et al.
7,938,151 B2 5/2011 Höckner
7,955,056 B2 6/2011 Pettersson
7,980,357 B2 7/2011 Edwards
8,056,635 B2 11/2011 Shampine et al.
8,083,504 B2 12/2011 Williams et al.
8,099,942 B2 1/2012 Alexander
8,186,334 B2 5/2012 Ooyama
8,196,555 B2 6/2012 Ikeda et al.
8,202,354 B2 6/2012 Iijima
8,316,936 B2 11/2012 Roddy et al.
8,336,631 B2 12/2012 Shampine et al.
8,388,317 B2 3/2013 Sung
8,414,673 B2 4/2013 Raje et al.
8,469,826 B2 6/2013 Brosowske
8,500,215 B2 8/2013 Gastauer
8,506,267 B2 8/2013 Gambier et al.
8,575,873 B2 11/2013 Peterson et al.
8,616,005 B1 12/2013 Cousino, Sr. et al.
8,621,873 B2 1/2014 Robertson et al.
8,641,399 B2 2/2014 Mucibabic
8,656,990 B2 2/2014 Kajaria et al.
8,672,606 B2 3/2014 Glynn et al.
8,707,853 B1 4/2014 Dille et al.
8,708,667 B2 4/2014 Collingborn
8,714,253 B2 5/2014 Sherwood et al.
8,757,918 B2 6/2014 Ramnarain et al.
8,763,583 B2 7/2014 Hofbauer et al.
8,770,329 B2 7/2014 Spitler
8,784,081 B1 7/2014 Blume
8,789,601 B2 7/2014 Broussard et al.
8,794,307 B2 8/2014 Coquilleau et al.
8,801,394 B2 8/2014 Anderson
8,851,186 B2 10/2014 Shampine et al.
8,851,441 B2 10/2014 Acuna et al.
8,886,502 B2 11/2014 Walters et al.
8,894,356 B2 11/2014 Lafontaine et al.
8,905,056 B2 12/2014 Kendrick
8,951,019 B2 2/2015 Hains et al.
8,973,560 B2 3/2015 Krug
8,997,904 B2 4/2015 Cryer et al.
9,011,111 B2 4/2015 Lesko
9,016,383 B2 4/2015 Shampine et al.
9,032,620 B2 5/2015 Frassinelli et al.
9,057,247 B2 6/2015 Kumar et al.
9,097,249 B2 8/2015 Petersen
9,103,193 B2 8/2015 Coli et al.
9,121,257 B2 9/2015 Coli et al.
9,140,110 B2 9/2015 Coli et al.
9,175,810 B2 11/2015 Hains
9,187,982 B2 11/2015 Dehring et al.
9,206,667 B2 12/2015 Khvoshchev et al.
9,212,643 B2 12/2015 Deliyski
9,217,318 B2 12/2015 Dusterhoft et al.
9,222,346 B1 12/2015 Walls
9,297,250 B2 3/2016 Dusterhoft et al.
9,324,049 B2 4/2016 Thomeer et al.
9,341,055 B2 5/2016 Weightman et al.
9,346,662 B2 5/2016 Van Vliet et al.
9,366,114 B2 6/2016 Coli et al.
9,376,786 B2 6/2016 Numasawa
9,394,829 B2 7/2016 Cabeen et al.
9,395,049 B2 7/2016 Vicknair et al.
9,401,670 B2 7/2016 Minato et al.
9,410,406 B2 8/2016 Yuan
9,410,410 B2 8/2016 Broussard et al.
9,410,546 B2 8/2016 Jaeger et al.
9,429,078 B1 8/2016 Crowe et al.
9,435,333 B2 9/2016 McCoy et al.
9,488,169 B2 11/2016 Cochran et al.
9,493,997 B2 11/2016 Liu et al.
9,512,783 B2 12/2016 Veilleux et al.
9,534,473 B2 1/2017 Morris et al.
9,546,652 B2 1/2017 Yin
9,550,501 B2 1/2017 Ledbetter
9,556,721 B2 1/2017 Jang et al.
9,562,420 B2 2/2017 Morris et al.
9,570,945 B2 2/2017 Fischer
9,579,980 B2 2/2017 Cryer et al.
9,587,649 B2 3/2017 Oehring
9,593,710 B2 3/2017 Laimboeck et al.
9,611,728 B2 4/2017 Oehring
9,617,808 B2 4/2017 Liu et al.
9,638,101 B1 5/2017 Crowe et al.
9,638,194 B2 5/2017 Wiegman et al.
9,650,871 B2 5/2017 Oehring et al.
9,656,762 B2 5/2017 Kamath et al.
9,689,316 B1 6/2017 Crom
9,695,808 B2 7/2017 Giessbach et al.
9,739,130 B2 8/2017 Young
9,764,266 B1 9/2017 Carter
9,777,748 B2 10/2017 Lu et al.
9,803,467 B2 10/2017 Tang et al.
9,803,793 B2 10/2017 Davi et al.
9,809,308 B2 11/2017 Aguilar et al.
9,829,002 B2 11/2017 Crom
9,840,897 B2 12/2017 Arson
9,840,901 B2 12/2017 Dering et al.
9,845,730 B2 12/2017 Betti et al.
9,850,422 B2 12/2017 Lestz et al.
9,856,131 B1 1/2018 Moffitt
9,863,279 B2 1/2018 Laing et al.
9,869,305 B1 1/2018 Crowe et al.
9,871,406 B1 1/2018 Churnock et al.
9,879,609 B1 1/2018 Crowe et al.
RE46,725 E 2/2018 Case et al.
9,893,500 B2 2/2018 Oehring et al.
9,893,660 B2 2/2018 Peterson et al.
9,897,003 B2 2/2018 Motakef et al.
9,920,615 B2 3/2018 Zhang et al.
9,945,365 B2 4/2018 Hernandez et al.

(56) References Cited

U.S. PATENT DOCUMENTS 9,964,052 B2 5/2018 Millican et al.
9,970,278 B2 5/2018 Broussard et al.
9,981,840 B2 5/2018 Shock
9,995,102 B2 6/2018 Dillie et al.
9,995,218 B2 6/2018 Oehring et al.
10,008,880 B2 6/2018 Vicknair et al.
10,008,912 B2 6/2018 Davey et al.
10,018,096 B2 7/2018 Wallimann et al.
10,020,711 B2 7/2018 Oehring et al.
10,024,123 B2 7/2018 Steffenhagen et al.
10,029,289 B2 7/2018 Wendorski et al.
10,030,579 B2 7/2018 Austin et al.
10,036,238 B2 7/2018 Oehring
10,040,541 B2 8/2018 Wilson et al.
10,060,293 B2 8/2018 Del Bono
10,060,349 B2 8/2018 Álvarez et al.
10,077,933 B2 9/2018 Nelson et al.
10,082,137 B2 9/2018 Graham et al.
10,094,366 B2 10/2018 Marica
10,100,827 B2 10/2018 Devan et al.
10,107,084 B2 10/2018 Coli et al.
10,107,085 B2 10/2018 Coli et al.
10,114,061 B2 10/2018 Frampton et al.
10,119,381 B2 11/2018 Oehring et al.
10,125,750 B2 11/2018 Pfaff
10,134,257 B2 11/2018 Zhang et al.
10,138,098 B2 11/2018 Sorensen et al.
10,151,244 B2 12/2018 Giancotti et al.
10,161,423 B2 12/2018 Rampen
10,174,599 B2 1/2019 Shampine et al.
10,184,397 B2 1/2019 Austin et al.
10,196,258 B2 2/2019 Kalala et al.
10,221,856 B2 3/2019 Hernandez et al.
10,227,854 B2 3/2019 Glass
10,227,855 B2 3/2019 Coli et al.
10,246,984 B2 4/2019 Payne et al.
10,247,182 B2 4/2019 Zhang et al.
10,253,598 B2 4/2019 Crews et al.
10,254,732 B2 4/2019 Oehring et al.
10,267,439 B2 4/2019 Pryce et al.
10,280,724 B2 5/2019 Hinderliter
10,287,943 B1 5/2019 Schiltz
10,288,519 B2 5/2019 De La Cruz
10,303,190 B2 5/2019 Shock
10,305,350 B2 5/2019 Johnson et al.
10,316,832 B2 6/2019 Byrne
10,317,875 B2 6/2019 Pandurangan et al.
10,329,888 B2 6/2019 Urbancic et al.
10,337,402 B2 7/2019 Austin et al.
10,358,035 B2 7/2019 Cryer
10,371,012 B2 8/2019 Davis et al.
10,374,485 B2 8/2019 Morris et al.
10,378,326 B2 8/2019 Morris et al.
10,393,108 B2 8/2019 Chong et al.
10,407,990 B2 9/2019 Oehring et al.
10,408,031 B2 9/2019 Oehring et al.
10,415,348 B2 9/2019 Zhang et al.
10,415,557 B1 9/2019 Crowe et al.
10,415,562 B2 9/2019 Kajita et al.
10,422,207 B2 9/2019 Aidagulov et al.
RE47,695 E 11/2019 Case et al.
10,465,689 B2 11/2019 Crom
10,478,753 B1 11/2019 Elms et al.
10,526,882 B2 1/2020 Oehring et al.
10,563,649 B2 2/2020 Zhang et al.
10,570,704 B2 2/2020 Colvin et al.
10,577,908 B2 3/2020 Kisra et al.
10,577,910 B2 3/2020 Stephenson
10,584,645 B2 3/2020 Nakagawa et al.
10,590,867 B2 3/2020 Thomassin et al.
10,598,258 B2 3/2020 Oehring et al.
10,605,060 B2 3/2020 Chuprakov et al.
10,610,842 B2 4/2020 Chong
10,662,749 B1 5/2020 Hill et al.
10,677,961 B1 6/2020 Chen et al.
10,711,787 B1 7/2020 Darley
10,738,580 B1 8/2020 Fischer et al.
10,753,153 B1 8/2020 Fischer et al.
10,753,165 B1 8/2020 Fischer et al.
10,760,416 B2 9/2020 Weng et al.
10,760,556 B1 9/2020 Crom et al.
10,794,165 B2 10/2020 Fischer et al.
10,794,166 B2 10/2020 Reckels et al.
10,801,311 B1 10/2020 Cui et al.
10,815,764 B1 10/2020 Yeung et al.
10,815,978 B2 10/2020 Glass
10,830,032 B1 11/2020 Zhang et al.
10,830,225 B2 11/2020 Repaci
10,851,633 B2 12/2020 Harper
10,859,203 B1 12/2020 Cui et al.
10,864,487 B1 12/2020 Han et al.
10,865,624 B1 12/2020 Cui et al.
10,865,631 B1 12/2020 Zhang et al.
10,870,093 B1 12/2020 Zhong et al.
10,871,045 B2 12/2020 Fischer et al.
10,895,202 B1 1/2021 Yeung et al.
10,900,475 B2 1/2021 Weightman et al.
10,907,459 B1 2/2021 Yeung et al.
10,914,139 B2 2/2021 Shahri et al.
10,920,538 B2 2/2021 Rodriguez Herrera et al.
10,920,552 B2 2/2021 Rodriguez Herrera et al.
10,927,774 B2 2/2021 Cai et al.
10,927,802 B2 2/2021 Oehring
10,954,770 B1 3/2021 Yeung et al.
10,954,855 B1 3/2021 Ji et al.
10,961,614 B1 3/2021 Yeung et al.
10,961,908 B1 3/2021 Yeung et al.
10,961,912 B1 3/2021 Yeung et al.
10,961,914 B1 3/2021 Yeung et al.
10,961,993 B1 3/2021 Ji et al.
10,961,995 B2 3/2021 Mayorca
10,892,596 B2 4/2021 Yeung et al.
10,968,837 B1 4/2021 Yeung et al.
10,982,523 B1 4/2021 Hill et al.
10,989,019 B2 4/2021 Cai et al.
10,989,180 B2 4/2021 Yeung et al.
10,995,564 B2 5/2021 Miller et al.
11,002,189 B2 5/2021 Yeung et al.
11,008,950 B2 5/2021 Ethier et al.
11,015,423 B1 5/2021 Yeung et al.
11,015,536 B2 5/2021 Yeung et al.
11,015,594 B2 5/2021 Yeung et al.
11,022,526 B1 6/2021 Yeung et al.
11,028,677 B1 6/2021 Yeung et al.
11,035,213 B2 6/2021 Dusterhoft et al.
11,035,214 B2 6/2021 Cui et al.
11,047,379 B1 6/2021 Li et al.
11,053,853 B2 7/2021 Li et al.
11,060,455 B1 7/2021 Yeung et al.
11,066,915 B1 * 7/2021 Yeung ................. E21B 43/2607
11,068,455 B2 7/2021 Shabi et al.
11,085,281 B1 8/2021 Yeung et al.
11,085,282 B2 8/2021 Mazrooee et al.
11,092,152 B2 8/2021 Yeung et al.
11,098,651 B1 8/2021 Yeung et al.
11,105,250 B1 8/2021 Zhang et al.
11,105,266 B2 8/2021 Zhou et al.
11,109,508 B1 8/2021 Yeung et al.
11,111,768 B1 9/2021 Yeung et al.
11,125,066 B1 9/2021 Yeung et al.
11,125,156 B2 9/2021 Zhang et al.
11,129,295 B1 9/2021 Yeung et al.
11,143,000 B2 10/2021 Li et al.
11,143,005 B2 10/2021 Dusterhoft et al.
11,143,006 B1 10/2021 Zhang et al.
11,149,533 B1 10/2021 Yeung et al.
11,149,726 B1 10/2021 Yeung et al.
11,156,159 B1 10/2021 Yeung et al.
11,168,681 B2 11/2021 Boguski
11,174,716 B1 11/2021 Yeung et al.
11,193,360 B1 12/2021 Yeung et al.
11,193,361 B1 12/2021 Yeung et al.
11,205,880 B1 12/2021 Yeung et al.
11,205,881 B2 12/2021 Yeung et al.

(56) References Cited

U.S. PATENT DOCUMENTS

| | | | |
|---|---|---|---|
| 11,208,879 | B1 | 12/2021 | Yeung et al. |
| 11,208,953 | B1 | 12/2021 | Yeung et al. |
| 11,220,895 | B1 | 1/2022 | Yeung et al. |
| 11,236,739 | B2 | 2/2022 | Yeung et al. |
| 11,242,737 | B2 | 2/2022 | Zhang et al. |
| 11,243,509 | B2 | 2/2022 | Cai et al. |
| 11,251,650 | B1 | 2/2022 | Liu et al. |
| 11,261,717 | B2 | 3/2022 | Yeung et al. |
| 11,268,346 | B2 | 3/2022 | Yeung et al. |
| 11,280,266 | B2 | 3/2022 | Yeung et al. |
| 11,306,835 | B1 | 4/2022 | Dille et al. |
| RE49,083 | E | 5/2022 | Case et al. |
| 11,339,638 | B1 | 5/2022 | Yeung et al. |
| 11,346,200 | B2 | 5/2022 | Cai et al. |
| 11,373,058 | B2 | 6/2022 | Jaaskelainen et al. |
| RE49,140 | E | 7/2022 | Case et al. |
| 11,377,943 | B2 | 7/2022 | Kriebel et al. |
| RE49,155 | E | 8/2022 | Case et al. |
| RE49,156 | E | 8/2022 | Case et al. |
| 11,401,927 | B2 | 8/2022 | Li et al. |
| 11,428,165 | B2 | 8/2022 | Yeung et al. |
| 11,441,483 | B2 | 9/2022 | Li et al. |
| 11,448,122 | B2 | 9/2022 | Feng et al. |
| 11,466,680 | B2 | 10/2022 | Yeung et al. |
| 11,480,040 | B2 | 10/2022 | Han et al. |
| 11,492,887 | B2 | 11/2022 | Cui et al. |
| 11,499,405 | B2 | 11/2022 | Zhang et al. |
| 11,506,039 | B2 | 11/2022 | Zhang et al. |
| 11,512,570 | B2 | 11/2022 | Yeung |
| 11,519,395 | B2 | 12/2022 | Zhang et al. |
| 11,519,405 | B2 | 12/2022 | Deng et al. |
| 11,530,602 | B2 | 12/2022 | Yeung et al. |
| 11,549,349 | B2 | 1/2023 | Wang et al. |
| 11,555,390 | B2 | 1/2023 | Cui et al. |
| 11,555,756 | B2 | 1/2023 | Yeung et al. |
| 11,557,887 | B2 | 1/2023 | Ji et al. |
| 11,560,779 | B2 | 1/2023 | Mao et al. |
| 11,560,845 | B2 | 1/2023 | Yeung et al. |
| 11,572,775 | B2 | 2/2023 | Mao et al. |
| 11,575,249 | B2 | 2/2023 | Ji et al. |
| 11,592,020 | B2 | 2/2023 | Chang et al. |
| 11,596,047 | B2 | 2/2023 | Liu et al. |
| 11,598,263 | B2 | 3/2023 | Yeung et al. |
| 11,603,797 | B2 | 3/2023 | Zhang et al. |
| 11,607,982 | B2 | 3/2023 | Tian et al. |
| 11,608,726 | B2 | 3/2023 | Zhang et al. |
| 11,624,326 | B2 | 4/2023 | Yeung et al. |
| 11,629,583 | B2 | 4/2023 | Yeung et al. |
| 11,629,589 | B2 | 4/2023 | Lin et al. |
| 11,649,766 | B1 | 5/2023 | Yeung et al. |
| 11,649,819 | B2 | 5/2023 | Gillispie |
| 11,662,384 | B2 | 5/2023 | Liu et al. |
| 11,668,173 | B2 | 6/2023 | Zhang et al. |
| 11,668,289 | B2 | 6/2023 | Chang et al. |
| 11,677,238 | B2 | 6/2023 | Liu et al. |
| 2002/0126922 | A1 | 9/2002 | Cheng et al. |
| 2002/0197176 | A1 | 12/2002 | Kondo |
| 2003/0031568 | A1 | 2/2003 | Stiefel |
| 2003/0061819 | A1 | 4/2003 | Kuroki et al. |
| 2003/0161212 | A1 | 8/2003 | Neal et al. |
| 2004/0016245 | A1 | 1/2004 | Pierson |
| 2004/0074238 | A1 | 4/2004 | Wantanabe et al. |
| 2004/0076526 | A1 | 4/2004 | Fukano et al. |
| 2004/0187950 | A1 | 9/2004 | Cohen et al. |
| 2004/0219040 | A1 | 11/2004 | Kugelev et al. |
| 2005/0051322 | A1 | 3/2005 | Speer |
| 2005/0056081 | A1 | 3/2005 | Gocho |
| 2005/0139286 | A1 | 6/2005 | Poulter |
| 2005/0196298 | A1 | 9/2005 | Manning |
| 2005/0226754 | A1 | 10/2005 | Orr et al. |
| 2005/0274134 | A1 | 12/2005 | Ryu et al. |
| 2006/0061091 | A1 | 3/2006 | Osterloh |
| 2006/0062914 | A1 | 3/2006 | Garg et al. |
| 2006/0155473 | A1 | 7/2006 | Soliman et al. |
| 2006/0196251 | A1 | 9/2006 | Richey |
| 2006/0211356 | A1 | 9/2006 | Grassman |
| 2006/0228225 | A1 | 10/2006 | Rogers |
| 2006/0260331 | A1 | 11/2006 | Andreychuk |
| 2006/0272333 | A1 | 12/2006 | Sundin |
| 2007/0029090 | A1 | 2/2007 | Andreychuk et al. |
| 2007/0041848 | A1 | 2/2007 | Wood et al. |
| 2007/0066406 | A1 | 3/2007 | Keller et al. |
| 2007/0098580 | A1 | 5/2007 | Petersen |
| 2007/0107981 | A1 | 5/2007 | Sicotte |
| 2007/0125544 | A1 | 6/2007 | Robinson et al. |
| 2007/0169543 | A1 | 7/2007 | Fazekas |
| 2007/0181212 | A1 | 8/2007 | Fell |
| 2007/0272407 | A1 | 11/2007 | Lehman et al. |
| 2007/0277982 | A1 | 12/2007 | Shampine et al. |
| 2007/0295569 | A1 | 12/2007 | Manzoor et al. |
| 2008/0006089 | A1 | 1/2008 | Adnan et al. |
| 2008/0041594 | A1 | 2/2008 | Boles et al. |
| 2008/0098891 | A1 | 5/2008 | Feher |
| 2008/0161974 | A1 | 7/2008 | Alston |
| 2008/0212275 | A1 | 9/2008 | Waryck et al. |
| 2008/0229757 | A1 | 9/2008 | Alexander et al. |
| 2008/0264625 | A1 | 10/2008 | Ochoa |
| 2008/0264649 | A1 | 10/2008 | Crawford |
| 2008/0298982 | A1 | 12/2008 | Pabst |
| 2009/0053072 | A1 | 2/2009 | Borgstadt et al. |
| 2009/0064685 | A1 | 3/2009 | Busekros et al. |
| 2009/0068031 | A1 | 3/2009 | Gambier et al. |
| 2009/0092510 | A1 | 4/2009 | Williams et al. |
| 2009/0124191 | A1 | 5/2009 | Van Becelaere et al. |
| 2009/0178412 | A1 | 7/2009 | Spytek |
| 2009/0212630 | A1 | 8/2009 | Flegel et al. |
| 2009/0249794 | A1 | 10/2009 | Wilkes et al. |
| 2009/0252616 | A1* | 10/2009 | Brunet .................. F04B 49/065 417/1 |
| 2009/0308602 | A1 | 12/2009 | Bruins et al. |
| 2010/0019626 | A1 | 1/2010 | Stout et al. |
| 2010/0071899 | A1 | 3/2010 | Coquilleau et al. |
| 2010/0218508 | A1 | 9/2010 | Brown et al. |
| 2010/0224365 | A1 | 9/2010 | Abad |
| 2010/0300683 | A1 | 12/2010 | Looper et al. |
| 2010/0310384 | A1 | 12/2010 | Stephenson et al. |
| 2011/0030963 | A1 | 2/2011 | Demong et al. |
| 2011/0041681 | A1 | 2/2011 | Duerr |
| 2011/0052423 | A1 | 3/2011 | Gambier et al. |
| 2011/0054704 | A1 | 3/2011 | Karpman et al. |
| 2011/0067857 | A1 | 3/2011 | Underhill et al. |
| 2011/0085924 | A1 | 4/2011 | Shampine et al. |
| 2011/0120702 | A1 | 5/2011 | Craig |
| 2011/0120705 | A1 | 5/2011 | Walters et al. |
| 2011/0120706 | A1 | 5/2011 | Craig |
| 2011/0120718 | A1 | 5/2011 | Craig |
| 2011/0125471 | A1 | 5/2011 | Craig et al. |
| 2011/0125476 | A1 | 5/2011 | Craig |
| 2011/0146244 | A1 | 6/2011 | Farman et al. |
| 2011/0146246 | A1 | 6/2011 | Farman et al. |
| 2011/0173991 | A1 | 7/2011 | Dean |
| 2011/0197988 | A1 | 8/2011 | Van Vliet et al. |
| 2011/0241888 | A1 | 10/2011 | Lu et al. |
| 2011/0265443 | A1 | 11/2011 | Ansari |
| 2011/0272158 | A1 | 11/2011 | Neal |
| 2012/0023973 | A1 | 2/2012 | Mayorca |
| 2012/0048242 | A1 | 3/2012 | Surnilla et al. |
| 2012/0085541 | A1 | 4/2012 | Love et al. |
| 2012/0137699 | A1 | 6/2012 | Montagne et al. |
| 2012/0179444 | A1 | 7/2012 | Ganguly et al. |
| 2012/0192542 | A1 | 8/2012 | Chillar et al. |
| 2012/0199001 | A1 | 8/2012 | Chillar et al. |
| 2012/0204627 | A1 | 8/2012 | Anderl et al. |
| 2012/0255734 | A1 | 10/2012 | Coli et al. |
| 2012/0310509 | A1 | 12/2012 | Pardo et al. |
| 2012/0324903 | A1 | 12/2012 | Dewis et al. |
| 2013/0068307 | A1 | 3/2013 | Hains et al. |
| 2013/0087045 | A1 | 4/2013 | Sullivan et al. |
| 2013/0087945 | A1 | 4/2013 | Kusters et al. |
| 2013/0134702 | A1 | 5/2013 | Boraas et al. |
| 2013/0140031 | A1 | 6/2013 | Cohen et al. |
| 2013/0189915 | A1 | 7/2013 | Hazard |
| 2013/0205798 | A1 | 8/2013 | Kwok et al. |
| 2013/0233165 | A1 | 9/2013 | Matzner et al. |

(56) References Cited

U.S. PATENT DOCUMENTS

2013/0255953 A1 10/2013 Tudor
2013/0259707 A1 10/2013 Yin
2013/0284455 A1 10/2013 Kajaria et al.
2013/0300341 A1 11/2013 Gillette
2013/0306322 A1 11/2013 Sanbom
2014/0000668 A1 1/2014 Lessard
2014/0010671 A1 1/2014 Cryer et al.
2014/0013768 A1 1/2014 Laing et al.
2014/0032082 A1 1/2014 Gehrke et al.
2014/0044517 A1 2/2014 Saha et al.
2014/0048253 A1 2/2014 Andreychuk
2014/0090729 A1 4/2014 Coulter et al.
2014/0090742 A1 4/2014 Coskrey et al.
2014/0094105 A1 4/2014 Lundh et al.
2014/0095114 A1 4/2014 Thomeer et al.
2014/0095554 A1 4/2014 Thomeer et al.
2014/0123621 A1 5/2014 Driessens et al.
2014/0130422 A1 5/2014 Laing et al.
2014/0138079 A1 5/2014 Broussard et al.
2014/0144641 A1 5/2014 Chandler
2014/0147291 A1 5/2014 Burnette
2014/0158345 A1 6/2014 Jang et al.
2014/0174097 A1 6/2014 Hammer et al.
2014/0196459 A1 7/2014 Futa et al.
2014/0216736 A1 8/2014 Leugemors et al.
2014/0219824 A1 8/2014 Burnette
2014/0250845 A1 9/2014 Jackson et al.
2014/0251623 A1 9/2014 Lestz et al.
2014/0262232 A1 9/2014 Dusterhoft et al.
2014/0277772 A1 9/2014 Lopez et al.
2014/0290266 A1 10/2014 Veilleux, Jr. et al.
2014/0318638 A1 10/2014 Harwood et al.
2014/0322050 A1 10/2014 Marette et al.
2015/0027730 A1 1/2015 Hall et al.
2015/0075778 A1 3/2015 Walters et al.
2015/0078924 A1 3/2015 Zhang et al.
2015/0096739 A1 4/2015 Ghasripoor et al.
2015/0101344 A1 4/2015 Jarrier et al.
2015/0114652 A1 4/2015 Lestz et al.
2015/0129210 A1 5/2015 Chong et al.
2015/0135659 A1 5/2015 Jarrier et al.
2015/0159553 A1 6/2015 Kippel et al.
2015/0176387 A1 6/2015 Wutherich
2015/0192117 A1 7/2015 Bridges
2015/0204148 A1 7/2015 Liu et al.
2015/0204174 A1 7/2015 Kresse et al.
2015/0204322 A1 7/2015 Iund et al.
2015/0211512 A1 7/2015 Wiegman et al.
2015/0214816 A1 7/2015 Raad
2015/0217672 A1 8/2015 Shampine et al.
2015/0226140 A1 8/2015 Zhang et al.
2015/0252661 A1 9/2015 Glass
2015/0275891 A1 10/2015 Chong et al.
2015/0337730 A1 11/2015 Kupiszewski et al.
2015/0340864 A1 11/2015 Compton
2015/0345385 A1 12/2015 Santini
2015/0369351 A1 12/2015 Hermann et al.
2016/0032703 A1 2/2016 Broussard et al.
2016/0032836 A1 2/2016 Hawkinson et al.
2016/0076447 A1 3/2016 Merlo et al.
2016/0090823 A1 3/2016 Alzahabi et al.
2016/0102581 A1 4/2016 Del Bono
2016/0105022 A1 4/2016 Oehring et al.
2016/0108705 A1 4/2016 Maxwell et al.
2016/0108713 A1 4/2016 Dunaeva et al.
2016/0123185 A1 5/2016 Le Pache et al.
2016/0168979 A1 6/2016 Zhang et al.
2016/0177675 A1 6/2016 Morris et al.
2016/0177945 A1 6/2016 Byrne et al.
2016/0186671 A1 6/2016 Austin et al.
2016/0195082 A1 7/2016 Wiegman et al.
2016/0215774 A1 7/2016 Oklejas et al.
2016/0230525 A1 8/2016 Lestz et al.
2016/0244314 A1 8/2016 Van Vliet et al.
2016/0248230 A1 8/2016 Tawy et al.
2016/0253634 A1 9/2016 Thomeer et al.
2016/0258267 A1 9/2016 Payne et al.
2016/0265330 A1 9/2016 Mazrooee et al.
2016/0265331 A1 9/2016 Weng et al.
2016/0273328 A1 9/2016 Oehring
2016/0273346 A1 9/2016 Tang et al.
2016/0290114 A1 10/2016 Oehring et al.
2016/0319650 A1 11/2016 Oehring et al.
2016/0326845 A1 11/2016 Djikpesse et al.
2016/0348479 A1 12/2016 Oehring et al.
2016/0369609 A1 12/2016 Morris et al.
2017/0009905 A1 1/2017 Arnold
2017/0016433 A1 1/2017 Chong et al.
2017/0030177 A1 2/2017 Oehring et al.
2017/0038137 A1 2/2017 Turney
2017/0045055 A1 2/2017 Hoefel et al.
2017/0051598 A1 2/2017 Ouenes
2017/0052087 A1 2/2017 Faqihi et al.
2017/0074074 A1 3/2017 Joseph et al.
2017/0074076 A1 3/2017 Joseph et al.
2017/0074089 A1 3/2017 Agarwal et al.
2017/0082110 A1 3/2017 Lammers
2017/0089189 A1 3/2017 Norris et al.
2017/0114613 A1 4/2017 Ecerf et al.
2017/0114625 A1 4/2017 Norris et al.
2017/0122310 A1 5/2017 Ladron de Guevara
2017/0131174 A1 5/2017 Enev et al.
2017/0145918 A1 5/2017 Oehring et al.
2017/0177992 A1 6/2017 Klie
2017/0191350 A1 7/2017 Johns et al.
2017/0218727 A1 8/2017 Oehring et al.
2017/0226839 A1 8/2017 Broussard et al.
2017/0226842 A1 8/2017 Omont et al.
2017/0226998 A1 8/2017 Zhang et al.
2017/0227002 A1 8/2017 Mikulski et al.
2017/0233103 A1 8/2017 Teicholz et al.
2017/0234165 A1 8/2017 Kersey et al.
2017/0234308 A1 8/2017 Buckley
2017/0241336 A1 8/2017 Jones et al.
2017/0241671 A1 8/2017 Ahmad
2017/0247995 A1 8/2017 Crews et al.
2017/0248034 A1 8/2017 Dzieciol et al.
2017/0248208 A1 8/2017 Tamura
2017/0248308 A1 8/2017 Makarychev-Mikhailov et al.
2017/0254186 A1 9/2017 Aidagulov et al.
2017/0275149 A1 9/2017 Schmidt
2017/0288400 A1 10/2017 Williams
2017/0292409 A1 10/2017 Aguilar et al.
2017/0302135 A1 10/2017 Cory
2017/0305736 A1 10/2017 Haile et al.
2017/0306847 A1 10/2017 Suciu et al.
2017/0306936 A1 10/2017 Dole
2017/0322086 A1 11/2017 Luharuka
2017/0328179 A1 11/2017 Dykstra et al.
2017/0333086 A1 11/2017 Jackson
2017/0334448 A1 11/2017 Schwunk
2017/0335842 A1 11/2017 Robinson et al.
2017/0350471 A1 12/2017 Steidl et al.
2017/0356470 A1 12/2017 Jaffrey
2017/0370199 A1 12/2017 Witkowski et al.
2017/0370480 A1 12/2017 Witkowski et al.
2018/0016895 A1 1/2018 Weng et al.
2018/0034280 A1 2/2018 Pedersen
2018/0038328 A1 2/2018 Louven et al.
2018/0041093 A1 2/2018 Miranda
2018/0045202 A1 2/2018 Crom
2018/0038216 A1 3/2018 Zhang et al.
2018/0058171 A1 3/2018 Roesner et al.
2018/0087499 A1 3/2018 Zhang et al.
2018/0087996 A1 3/2018 De La Cruz
2018/0149000 A1 5/2018 Roussel et al.
2018/0156210 A1 6/2018 Oehring et al.
2018/0172294 A1 6/2018 Owen
2018/0183219 A1 6/2018 Oehring et al.
2018/0186442 A1 7/2018 Maier
2018/0187662 A1 7/2018 Hill et al.
2018/0209415 A1 7/2018 Zhang et al.
2018/0223640 A1 8/2018 Keihany et al.
2018/0224044 A1 8/2018 Penney

(56) References Cited

U.S. PATENT DOCUMENTS

2018/0229998 A1 8/2018 Shock
2018/0230780 A1 8/2018 Klenner et al.
2018/0258746 A1 9/2018 Broussard et al.
2018/0266412 A1 9/2018 Stokkevag et al.
2018/0278124 A1 9/2018 Oehring et al.
2018/0283102 A1 10/2018 Cook
2018/0283618 A1 10/2018 Cook
2018/0284817 A1 10/2018 Cook et al.
2018/0290877 A1 10/2018 Shock
2018/0291781 A1 10/2018 Pedrini
2018/0298731 A1 10/2018 Bishop
2018/0298735 A1 10/2018 Conrad
2018/0307255 A1 10/2018 Bishop
2018/0313456 A1 11/2018 Bayyouk et al.
2018/0328157 A1 11/2018 Bishop
2018/0334893 A1 11/2018 Behring
2018/0363435 A1 12/2018 Coli et al.
2018/0363436 A1 12/2018 Coli et al.
2018/0363437 A1 12/2018 Coli et al.
2018/0363438 A1 12/2018 Coli et al.
2019/0003272 A1 1/2019 Morris et al.
2019/0003329 A1 1/2019 Morris et al.
2019/0010793 A1 1/2019 Hinderliter
2019/0011051 A1 1/2019 Yeung
2019/0048993 A1 2/2019 Akiyama et al.
2019/0055836 A1 2/2019 Felkl et al.
2019/0063263 A1 2/2019 Davis et al.
2019/0063341 A1 2/2019 Davis
2019/0067991 A1 2/2019 Davis et al.
2019/0071946 A1 3/2019 Painter et al.
2019/0071992 A1 3/2019 Feng
2019/0072005 A1 3/2019 Fisher et al.
2019/0078471 A1 3/2019 Braglia et al.
2019/0088845 A1 3/2019 Sugi et al.
2019/0091619 A1 3/2019 Huang
2019/0106316 A1 4/2019 Van Vliet et al.
2019/0106970 A1 4/2019 Oehring
2019/0112908 A1 4/2019 Coli et al.
2019/0112910 A1 4/2019 Oehring et al.
2019/0119096 A1 4/2019 Haile et al.
2019/0120024 A1 4/2019 Oehring et al.
2019/0120031 A1 4/2019 Gilje
2019/0120134 A1 4/2019 Goleczka et al.
2019/0128247 A1 5/2019 Douglas, III
2019/0128288 A1 5/2019 Konada et al.
2019/0131607 A1 5/2019 Gillette
2019/0136677 A1 5/2019 Shampine et al.
2019/0153843 A1 5/2019 Headrick
2019/0153938 A1 5/2019 Hammoud
2019/0154020 A1 5/2019 Glass
2019/0155318 A1 5/2019 Meunier
2019/0264667 A1 5/2019 Byrne
2019/0169962 A1 6/2019 Agrawi et al.
2019/0178234 A1 6/2019 Beisel
2019/0178235 A1 6/2019 Coskrey et al.
2019/0185312 A1 6/2019 Bush et al.
2019/0203572 A1 7/2019 Morris et al.
2019/0204021 A1 7/2019 Morris et al.
2019/0211661 A1 7/2019 Reckles et al.
2019/0211814 A1 7/2019 Weightman et al.
2019/0217258 A1 7/2019 Bishop
2019/0226317 A1 7/2019 Payne et al.
2019/0245348 A1 8/2019 Hinderliter et al.
2019/0249652 A1 8/2019 Stephenson et al.
2019/0249754 A1 8/2019 Oehring et al.
2019/0257297 A1 8/2019 Botting et al.
2019/0277279 A1 9/2019 Byrne et al.
2019/0277295 A1 9/2019 Clyburn et al.
2019/0309585 A1 10/2019 Miller et al.
2019/0316447 A1 10/2019 Oehring et al.
2019/0316456 A1 10/2019 Beisel et al.
2019/0323337 A1 10/2019 Glass et al.
2019/0330923 A1 10/2019 Gable et al.
2019/0331117 A1 10/2019 Gable et al.
2019/0337392 A1 11/2019 Joshi et al.
2019/0338762 A1 11/2019 Curry et al.
2019/0345920 A1 11/2019 Surjaatmadja et al.
2019/0353103 A1 11/2019 Roberge
2019/0356199 A1 11/2019 Morris et al.
2019/0376449 A1 12/2019 Carrell
2019/0383123 A1 12/2019 Hinderliter
2020/0003205 A1 1/2020 Stokkevåg et al.
2020/0011165 A1 1/2020 George et al.
2020/0040878 A1 2/2020 Morris
2020/0049136 A1 2/2020 Stephenson
2020/0049153 A1 2/2020 Headrick et al.
2020/0071998 A1 3/2020 Oehring et al.
2020/0072201 A1 3/2020 Marica
2020/0088202 A1 3/2020 Sigmar et al.
2020/0095854 A1 3/2020 Hinderliter
2020/0109610 A1 4/2020 Husoy et al.
2020/0109616 A1 4/2020 Oehring et al.
2020/0132058 A1 4/2020 Mollatt
2020/0141219 A1 5/2020 Oehring et al.
2020/0141326 A1 5/2020 Redford et al.
2020/0141907 A1 5/2020 Meck et al.
2020/0166026 A1 5/2020 Marica
2020/0206704 A1 7/2020 Chong
2020/0208733 A1 7/2020 Kim
2020/0223648 A1 7/2020 Herman et al.
2020/0224645 A1 7/2020 Buckley
2020/0225381 A1 7/2020 Walles et al.
2020/0232454 A1 7/2020 Chretien et al.
2020/0256333 A1 8/2020 Surjaatmadja
2020/0263498 A1 8/2020 Fischer et al.
2020/0263525 A1 8/2020 Reid
2020/0263526 A1 8/2020 Fischer et al.
2020/0263527 A1 8/2020 Fischer et al.
2020/0263528 A1 8/2020 Fischer et al.
2020/0267888 A1 8/2020 Putz
2020/0291731 A1 9/2020 Haiderer et al.
2020/0295574 A1 9/2020 Batsch-Smith
2020/0300050 A1* 9/2020 Oehring .................. E21B 21/08
2020/0309027 A1 10/2020 Rytkonen
2020/0309113 A1 10/2020 Hunter et al.
2020/0325752 A1 10/2020 Clark et al.
2020/0325760 A1 10/2020 Markham
2020/0325761 A1 10/2020 Williams
2020/0325791 A1 10/2020 Himmelmann
2020/0325893 A1 10/2020 Kraige et al.
2020/0332784 A1 10/2020 Zhang et al.
2020/0332788 A1 10/2020 Cui et al.
2020/0340313 A1 10/2020 Fischer et al.
2020/0340340 A1 10/2020 Oehring et al.
2020/0340344 A1 10/2020 Reckels et al.
2020/0340404 A1 10/2020 Stockstill
2020/0347725 A1 11/2020 Morris et al.
2020/0354928 A1 11/2020 Wehler et al.
2020/0355055 A1* 11/2020 Dusterhoft .............. E21B 43/25
2020/0362760 A1 11/2020 Morenko et al.
2020/0362764 A1 11/2020 Saintignan et al.
2020/0370394 A1 11/2020 Cai et al.
2020/0370408 A1 11/2020 Cai et al.
2020/0370429 A1 11/2020 Cai et al.
2020/0371490 A1 11/2020 Cai et al.
2020/0340322 A1 12/2020 Sizemore et al.
2020/0386169 A1 12/2020 Hinderliter et al.
2020/0386222 A1 12/2020 Pham et al.
2020/0388140 A1 12/2020 Gomez et al.
2020/0392826 A1 12/2020 Cui et al.
2020/0392827 A1 12/2020 George et al.
2020/0393088 A1 12/2020 Sizemore et al.
2020/0398238 A1* 12/2020 Zhong ..................... B01F 33/81
2020/0400000 A1 12/2020 Ghasripoor et al.
2020/0400005 A1 12/2020 Han et al.
2020/0407625 A1 12/2020 Stephenson
2020/0408071 A1 12/2020 Li et al.
2020/0408144 A1 12/2020 Feng et al.
2020/0408147 A1 12/2020 Zhang et al.
2020/0408149 A1 12/2020 Li et al.
2021/0010361 A1 1/2021 Kriebel et al.
2021/0010362 A1 1/2021 Kriebel et al.
2021/0025324 A1 1/2021 Morris et al.
2021/0025383 A1 1/2021 Bodishbaugh et al.

(56) References Cited

U.S. PATENT DOCUMENTS

2021/0032961 A1 2/2021 Hinderliter et al.
2021/0054727 A1 2/2021 Floyd
2021/0071503 A1 3/2021 Ogg et al.
2021/0071574 A1 3/2021 Feng et al.
2021/0071579 A1 3/2021 Li et al.
2021/0071654 A1 3/2021 Brunson
2021/0071752 A1 3/2021 Cui et al.
2021/0079758 A1 3/2021 Yeung et al.
2021/0079851 A1 3/2021 Yeung et al.
2021/0086851 A1 3/2021 Zhang et al.
2021/0087883 A1 3/2021 Zhang et al.
2021/0087916 A1 3/2021 Zhang et al.
2021/0087925 A1 3/2021 Heidari et al.
2021/0087943 A1 3/2021 Cui et al.
2021/0088042 A1 3/2021 Zhang et al.
2021/0123425 A1 4/2021 Cui et al.
2021/0123434 A1 4/2021 Cui et al.
2021/0123435 A1 4/2021 Cui et al.
2021/0131409 A1 5/2021 Cui et al.
2021/0140416 A1 5/2021 Buckley
2021/0148208 A1 5/2021 Thomas et al.
2021/0156240 A1 5/2021 Cicci et al.
2021/0156241 A1 5/2021 Cook
2021/0172282 A1 6/2021 Wang et al.
2021/0180517 A1 6/2021 Zhou et al.
2021/0190045 A1 6/2021 Zhang et al.
2021/0199110 A1 7/2021 Albert et al.
2021/0222690 A1 7/2021 Beisel
2021/0239112 A1 8/2021 Buckley
2021/0246774 A1 8/2021 Cui et al.
2021/0270261 A1 9/2021 Zhang et al.
2021/0270264 A1 9/2021 Byrne
2021/0285311 A1 9/2021 Ji et al.
2021/0285432 A1 9/2021 Ji et al.
2021/0301807 A1 9/2021 Cui et al.
2021/0306720 A1 9/2021 Sandoval et al.
2021/0308638 A1 10/2021 Zhong et al.
2021/0324718 A1 10/2021 Anders
2021/0348475 A1 11/2021 Yeung et al.
2021/0348476 A1 11/2021 Yeung et al.
2021/0348477 A1 11/2021 Yeung et al.
2021/0355927 A1 11/2021 Jian et al.
2021/0372394 A1 12/2021 Bagulayan et al.
2021/0372395 A1 12/2021 Li et al.
2021/0376413 A1 12/2021 Asfha
2021/0388760 A1 12/2021 Feng et al.
2022/0082007 A1 3/2022 Zhang et al.
2022/0090476 A1 3/2022 Zhang et al.
2022/0090477 A1 3/2022 Zhang et al.
2022/0090478 A1 3/2022 Zhang et al.
2022/0112892 A1 4/2022 Cui et al.
2022/0120262 A1 4/2022 Ji et al.
2022/0145740 A1 5/2022 Yuan et al.
2022/0154775 A1 5/2022 Iu et al.
2022/0155373 A1 5/2022 Liu et al.
2022/0162931 A1 5/2022 Zhong et al.
2022/0162991 A1 5/2022 Zhang et al.
2022/0181859 A1 6/2022 Ji et al.
2022/0186724 A1 6/2022 Chang et al.
2022/0213777 A1 7/2022 Cui et al.
2022/0220836 A1 7/2022 Zhang et al.
2022/0224087 A1 7/2022 Ji et al.
2022/0228468 A1 7/2022 Cui et al.
2022/0228469 A1 7/2022 Zhang et al.
2022/0235639 A1 7/2022 Zhang et al.
2022/0235640 A1 7/2022 Mao et al.
2022/0235641 A1 7/2022 Zhang et al.
2022/0235642 A1 7/2022 Zhang et al.
2022/0235802 A1 7/2022 Jiang et al.
2022/0242297 A1 8/2022 Tian et al.
2022/0243613 A1 8/2022 Ji et al.
2022/0243724 A1 8/2022 Li et al.
2022/0250000 A1 8/2022 Zhang et al.
2022/0255319 A1 8/2022 Liu et al.
2022/0258659 A1 8/2022 Cui et al.
2022/0259947 A1 8/2022 Li et al.
2022/0259964 A1 8/2022 Zhang et al.
2022/0268201 A1 8/2022 Feng et al.
2022/0282606 A1 9/2022 Zhong et al.
2022/0282726 A1 9/2022 Zhang et al.
2022/0290549 A1 9/2022 Zhang et al.
2022/0294194 A1 9/2022 Cao et al.
2022/0298906 A1 9/2022 Zhong et al.
2022/0307359 A1 9/2022 Liu et al.
2022/0307424 A1 9/2022 Wang et al.
2022/0314248 A1 10/2022 Ge et al.
2022/0315347 A1 10/2022 Liu et al.
2022/0316306 A1 10/2022 Liu et al.
2022/0316362 A1 10/2022 Zhang et al.
2022/0316461 A1 10/2022 Wang et al.
2022/0325608 A1 10/2022 Zhang et al.
2022/0330411 A1 10/2022 Liu et al.
2022/0333471 A1 10/2022 Zhong et al.
2022/0339646 A1 10/2022 Yu et al.
2022/0341358 A1 10/2022 Ji et al.
2022/0341362 A1 10/2022 Feng et al.
2022/0341415 A1 10/2022 Deng et al.
2022/0345007 A1 10/2022 Liu et al.
2022/0349345 A1 11/2022 Zhang et al.
2022/0353980 A1 11/2022 Liu et al.
2022/0361309 A1 11/2022 Liu et al.
2022/0364452 A1 11/2022 Wang et al.
2022/0364453 A1 11/2022 Chang et al.
2022/0372865 A1 11/2022 Lin et al.
2022/0376280 A1 11/2022 Shao et al.
2022/0381126 A1 12/2022 Cui et al.
2022/0389799 A1 12/2022 Mao
2022/0389803 A1 12/2022 Zhang et al.
2022/0389804 A1 12/2022 Cui et al.
2022/0389865 A1 12/2022 Feng et al.
2022/0389867 A1 12/2022 Li et al.
2022/0412196 A1 12/2022 Cui et al.
2022/0412199 A1 12/2022 Mao et al.
2022/0412200 A1 12/2022 Zhang et al.
2022/0412258 A1 12/2022 Li et al.
2022/0412379 A1 12/2022 Wang et al.
2023/0001524 A1 1/2023 Jiang et al.
2023/0003238 A1 1/2023 Du et al.
2023/0015132 A1 1/2023 Feng et al.
2023/0015529 A1 1/2023 Zhang et al.
2023/0015581 A1 1/2023 Ji et al.
2023/0017968 A1 1/2023 Deng et al.
2023/0029574 A1 2/2023 Zhang et al.
2023/0029671 A1 2/2023 Han et al.
2023/0036118 A1 2/2023 Xing et al.
2023/0040970 A1 2/2023 Liu et al.
2023/0042379 A1 2/2023 Zhang et al.
2023/0047033 A1 2/2023 Fu et al.
2023/0048551 A1 2/2023 Feng et al.
2023/0049462 A1 2/2023 Zhang et al.
2023/0064964 A1 3/2023 Wang et al.
2023/0074794 A1 3/2023 Liu et al.
2023/0085124 A1 3/2023 Zhong et al.
2023/0092506 A1 3/2023 Zhong et al.
2023/0092705 A1 3/2023 Liu et al.
2023/0106683 A1 4/2023 Zhang et al.
2023/0107300 A1 4/2023 Huang et al.
2023/0107791 A1 4/2023 Zhang et al.
2023/0109018 A1 4/2023 Du et al.
2023/0116458 A1 4/2023 Liu et al.
2023/0117362 A1 4/2023 Zhang et al.
2023/0119725 A1 4/2023 Wang et al.
2023/0119876 A1 4/2023 Mao et al.
2023/0119896 A1 4/2023 Zhang et al.
2023/0120810 A1 4/2023 Fu et al.
2023/0121251 A1 4/2023 Cui et al.
2023/0124444 A1 4/2023 Chang et al.
2023/0138582 A1 5/2023 Li et al.
2023/0144116 A1 5/2023 Li et al.
2023/0145963 A1 5/2023 Zhang et al.
2023/0151722 A1 5/2023 Cui et al.
2023/0151723 A1 5/2023 Ji et al.
2023/0152793 A1 5/2023 Wang et al.
2023/0160289 A1 5/2023 Cui et al.

(56) References Cited

U.S. PATENT DOCUMENTS

2023/0160510 A1 5/2023 Bao et al.
2023/0163580 A1 5/2023 Ji et al.
2023/0167776 A1 6/2023 Cui et al.

FOREIGN PATENT DOCUMENTS

CA 2043184 8/1994
CA 2829762 9/2012
CA 2737321 9/2013
CA 2876687 A1 5/2014
CA 2693567 9/2014
CA 2964597 10/2017
CA 2876687 C 4/2019
CA 3138533 11/2020
CA 2919175 3/2021
CN 2622404 6/2004
CN 2779054 5/2006
CN 2890325 4/2007
CN 200964929 Y 10/2007
CN 101323151 A 12/2008
CN 201190660 Y 2/2009
CN 201190892 Y 2/2009
CN 201190893 Y 2/2009
CN 101414171 A 4/2009
CN 201215073 Y 4/2009
CN 201236650 Y 5/2009
CN 201275542 Y 7/2009
CN 201275801 Y 7/2009
CN 201333385 Y 10/2009
CN 201443300 U 4/2010
CN 201496415 U 6/2010
CN 201501365 U 6/2010
CN 201507271 U 6/2010
CN 101323151 B 7/2010
CN 201560210 U 8/2010
CN 201581862 U 9/2010
CN 201610728 U 10/2010
CN 201610751 U 10/2010
CN 201618530 U 11/2010
CN 201661255 U 12/2010
CN 101949382 1/2011
CN 201756927 U 3/2011
CN 101414171 B 5/2011
CN 102128011 A 7/2011
CN 102140898 A 8/2011
CN 102155172 A 8/2011
CN 102182904 9/2011
CN 202000930 U 10/2011
CN 202055781 U 11/2011
CN 202082265 U 12/2011
CN 202100216 U 1/2012
CN 202100217 U 1/2012
CN 202100815 U 1/2012
CN 202124340 U 1/2012
CN 202140051 U 2/2012
CN 202140080 U 2/2012
CN 202144789 U 2/2012
CN 202144943 U 2/2012
CN 202149354 U 2/2012
CN 102383748 A 3/2012
CN 202156297 U 3/2012
CN 202158355 U 3/2012
CN 202163504 U 3/2012
CN 202165236 U 3/2012
CN 202180866 U 4/2012
CN 202181875 U 4/2012
CN 202187744 U 4/2012
CN 202191854 U 4/2012
CN 202250008 U 5/2012
CN 101885307 7/2012
CN 102562020 A 7/2012
CN 202326156 U 7/2012
CN 202370773 U 8/2012
CN 202417397 U 9/2012
CN 202417461 U 9/2012
CN 102729335 A 10/2012
CN 202463955 U 10/2012
CN 202463957 U 10/2012
CN 202467739 U 10/2012
CN 202467801 U 10/2012
CN 202531016 U 11/2012
CN 202544794 U 11/2012
CN 102825039 A 12/2012
CN 202578592 U 12/2012
CN 202579164 U 12/2012
CN 202594808 U 12/2012
CN 202594928 U 12/2012
CN 202596615 U 12/2012
CN 202596616 U 12/2012
CN 102849880 A 1/2013
CN 102889191 A 1/2013
CN 202641535 U 1/2013
CN 202645475 U 1/2013
CN 202666716 U 1/2013
CN 202669645 U 1/2013
CN 202669944 U 1/2013
CN 202671336 U 1/2013
CN 202673269 U 1/2013
CN 202751982 U 2/2013
CN 102963629 A 3/2013
CN 202767964 U 3/2013
CN 202789791 U 3/2013
CN 202789792 U 3/2013
CN 202810717 U 3/2013
CN 202827276 U 3/2013
CN 202833093 U 3/2013
CN 202833370 U 3/2013
CN 102140898 B 4/2013
CN 202895467 U 4/2013
CN 202926404 U 5/2013
CN 202935216 U 5/2013
CN 202935798 U 5/2013
CN 202935816 U 5/2013
CN 202970631 U 6/2013
CN 103223315 A 7/2013
CN 203050598 U 7/2013
CN 103233714 A 8/2013
CN 103233715 A 8/2013
CN 103245523 A 8/2013
CN 103247220 A 8/2013
CN 103253839 A 8/2013
CN 103277290 A 9/2013
CN 103321782 A 9/2013
CN 203170270 U 9/2013
CN 203172509 U 9/2013
CN 203175778 U 9/2013
CN 203175787 U 9/2013
CN 102849880 B 10/2013
CN 203241231 U 10/2013
CN 203244941 U 10/2013
CN 203244942 U 10/2013
CN 203303798 U 11/2013
CN 102155172 B 12/2013
CN 102729335 B 12/2013
CN 103420532 A 12/2013
CN 203321792 U 12/2013
CN 203412658 1/2014
CN 203420697 U 2/2014
CN 203480755 U 3/2014
CN 103711437 A 4/2014
CN 203531815 U 4/2014
CN 203531871 U 4/2014
CN 203531883 U 4/2014
CN 203556164 U 4/2014
CN 203558809 U 4/2014
CN 203559861 U 4/2014
CN 203559893 U 4/2014
CN 203560189 U 4/2014
CN 102704870 B 5/2014
CN 203611843 U 5/2014
CN 203612531 U 5/2014
CN 203612843 U 5/2014
CN 203614062 U 5/2014
CN 203614388 U 5/2014

(56) References Cited

FOREIGN PATENT DOCUMENTS

| | | | |
|---|---|---|---|
| CN | 203621045 | U | 6/2014 |
| CN | 203621046 | U | 6/2014 |
| CN | 203621051 | U | 6/2014 |
| CN | 203640993 | U | 6/2014 |
| CN | 203655221 | U | 6/2014 |
| CN | 103899280 | A | 7/2014 |
| CN | 103923670 | A | 7/2014 |
| CN | 203685052 | U | 7/2014 |
| CN | 203716936 | U | 7/2014 |
| CN | 103990410 | A | 8/2014 |
| CN | 103993869 | A | 8/2014 |
| CN | 203754009 | U | 8/2014 |
| CN | 203754025 | U | 8/2014 |
| CN | 203754341 | U | 8/2014 |
| CN | 203756614 | U | 8/2014 |
| CN | 203770264 | U | 8/2014 |
| CN | 203784519 | U | 8/2014 |
| CN | 203784520 | U | 8/2014 |
| CN | 104057864 | A | 9/2014 |
| CN | 203819819 | U | 9/2014 |
| CN | 203823431 | U | 9/2014 |
| CN | 203835337 | U | 9/2014 |
| CN | 104074500 | A | 10/2014 |
| CN | 203876633 | U | 10/2014 |
| CN | 203876636 | U | 10/2014 |
| CN | 203877364 | U | 10/2014 |
| CN | 203877365 | U | 10/2014 |
| CN | 203877375 | U | 10/2014 |
| CN | 203877424 | U | 10/2014 |
| CN | 203879476 | U | 10/2014 |
| CN | 203879479 | U | 10/2014 |
| CN | 203890292 | U | 10/2014 |
| CN | 203899476 | U | 10/2014 |
| CN | 203906206 | U | 10/2014 |
| CN | 104150728 | A | 11/2014 |
| CN | 104176522 | A | 12/2014 |
| CN | 104196464 | A | 12/2014 |
| CN | 104234651 | A | 12/2014 |
| CN | 203971841 | U | 12/2014 |
| CN | 203975450 | U | 12/2014 |
| CN | 204020788 | U | 12/2014 |
| CN | 204021980 | U | 12/2014 |
| CN | 204024625 | U | 12/2014 |
| CN | 204051401 | U | 12/2014 |
| CN | 204060661 | U | 12/2014 |
| CN | 104260672 | A | 1/2015 |
| CN | 104314512 | A | 1/2015 |
| CN | 204077478 | U | 1/2015 |
| CN | 204077526 | U | 1/2015 |
| CN | 204078307 | U | 1/2015 |
| CN | 204083051 | U | 1/2015 |
| CN | 204113168 | U | 1/2015 |
| CN | 104340682 | A | 2/2015 |
| CN | 104358536 | A | 2/2015 |
| CN | 104369687 | A | 2/2015 |
| CN | 104402178 | A | 3/2015 |
| CN | 104402185 | A | 3/2015 |
| CN | 104402186 | A | 3/2015 |
| CN | 204209819 | U | 3/2015 |
| CN | 204224560 | U | 3/2015 |
| CN | 204225813 | U | 3/2015 |
| CN | 204225839 | U | 3/2015 |
| CN | 104533392 | A | 4/2015 |
| CN | 104563938 | A | 4/2015 |
| CN | 104563994 | A | 4/2015 |
| CN | 104563995 | A | 4/2015 |
| CN | 104563998 | A | 4/2015 |
| CN | 104564033 | A | 4/2015 |
| CN | 204257122 | U | 4/2015 |
| CN | 204283610 | U | 4/2015 |
| CN | 204283782 | U | 4/2015 |
| CN | 204297682 | U | 4/2015 |
| CN | 204299810 | U | 4/2015 |
| CN | 103223315 | B | 5/2015 |
| CN | 104594857 | A | 5/2015 |
| CN | 104595493 | A | 5/2015 |
| CN | 104612647 | A | 5/2015 |
| CN | 104612928 | A | 5/2015 |
| CN | 104632126 | A | 5/2015 |
| CN | 204325094 | U | 5/2015 |
| CN | 204325098 | U | 5/2015 |
| CN | 204326983 | U | 5/2015 |
| CN | 204326985 | U | 5/2015 |
| CN | 204344040 | U | 5/2015 |
| CN | 204344095 | U | 5/2015 |
| CN | 104727797 | A | 6/2015 |
| CN | 204402414 | U | 6/2015 |
| CN | 204402423 | U | 6/2015 |
| CN | 204402450 | U | 6/2015 |
| CN | 103247220 | B | 7/2015 |
| CN | 104803568 | A | 7/2015 |
| CN | 204436360 | U | 7/2015 |
| CN | 204457524 | U | 7/2015 |
| CN | 204472485 | U | 7/2015 |
| CN | 204473625 | U | 7/2015 |
| CN | 204477303 | U | 7/2015 |
| CN | 204493095 | U | 7/2015 |
| CN | 204493309 | U | 7/2015 |
| CN | 103253839 | B | 8/2015 |
| CN | 104820372 | A | 8/2015 |
| CN | 104832093 | A | 8/2015 |
| CN | 104863523 | A | 8/2015 |
| CN | 204552723 | U | 8/2015 |
| CN | 204553866 | U | 8/2015 |
| CN | 204571831 | U | 8/2015 |
| CN | 204703814 | U | 10/2015 |
| CN | 204703833 | U | 10/2015 |
| CN | 204703834 | U | 10/2015 |
| CN | 105092401 | A | 11/2015 |
| CN | 103233715 | B | 12/2015 |
| CN | 103790927 | | 12/2015 |
| CN | 105207097 | | 12/2015 |
| CN | 204831952 | U | 12/2015 |
| CN | 204899777 | U | 12/2015 |
| CN | 102602323 | | 1/2016 |
| CN | 105240064 | A | 1/2016 |
| CN | 204944834 | | 1/2016 |
| CN | 205042127 | U | 2/2016 |
| CN | 205172478 | U | 4/2016 |
| CN | 103993869 | B | 5/2016 |
| CN | 105536299 | A | 5/2016 |
| CN | 105545207 | A | 5/2016 |
| CN | 205260249 | | 5/2016 |
| CN | 103233714 | B | 6/2016 |
| CN | 104340682 | B | 6/2016 |
| CN | 205297518 | U | 6/2016 |
| CN | 205298447 | U | 6/2016 |
| CN | 205391821 | U | 7/2016 |
| CN | 205400701 | U | 7/2016 |
| CN | 103277290 | B | 8/2016 |
| CN | 104260672 | B | 8/2016 |
| CN | 205477370 | U | 8/2016 |
| CN | 205479153 | U | 8/2016 |
| CN | 205503058 | U | 8/2016 |
| CN | 205503068 | U | 8/2016 |
| CN | 205503089 | U | 8/2016 |
| CN | 105958098 | A | 9/2016 |
| CN | 205599180 | | 9/2016 |
| CN | 205599180 | U | 9/2016 |
| CN | 106121577 | A | 11/2016 |
| CN | 205709587 | | 11/2016 |
| CN | 104612928 | B | 12/2016 |
| CN | 106246120 | A | 12/2016 |
| CN | 205805471 | | 12/2016 |
| CN | 106321045 | A | 1/2017 |
| CN | 205858306 | | 1/2017 |
| CN | 106438310 | A | 2/2017 |
| CN | 205937833 | | 2/2017 |
| CN | 104563994 | B | 3/2017 |
| CN | 206129196 | | 4/2017 |
| CN | 104369687 | B | 5/2017 |
| CN | 106715165 | | 5/2017 |
| CN | 106761561 | A | 5/2017 |
| CN | 105240064 | B | 6/2017 |

(56) References Cited

FOREIGN PATENT DOCUMENTS

| | | | |
|---|---|---|---|
| CN | 206237147 | | 6/2017 |
| CN | 206287832 | | 6/2017 |
| CN | 206346711 | | 7/2017 |
| CN | 104563995 | B | 9/2017 |
| CN | 107120822 | | 9/2017 |
| CN | 107143298 | A | 9/2017 |
| CN | 107159046 | A | 9/2017 |
| CN | 107188018 | A | 9/2017 |
| CN | 206496016 | | 9/2017 |
| CN | 104564033 | B | 10/2017 |
| CN | 107234358 | A | 10/2017 |
| CN | 107261975 | A | 10/2017 |
| CN | 206581929 | | 10/2017 |
| CN | 104820372 | B | 12/2017 |
| CN | 105092401 | B | 12/2017 |
| CN | 107476769 | A | 12/2017 |
| CN | 107520526 | A | 12/2017 |
| CN | 206754664 | | 12/2017 |
| CN | 107605427 | A | 1/2018 |
| CN | 106438310 | B | 2/2018 |
| CN | 107654196 | A | 2/2018 |
| CN | 107656499 | A | 2/2018 |
| CN | 107728657 | A | 2/2018 |
| CN | 206985503 | | 2/2018 |
| CN | 207017968 | | 2/2018 |
| CN | 107859053 | A | 3/2018 |
| CN | 207057867 | | 3/2018 |
| CN | 207085817 | | 3/2018 |
| CN | 105545207 | B | 4/2018 |
| CN | 107883091 | A | 4/2018 |
| CN | 107902427 | A | 4/2018 |
| CN | 107939290 | A | 4/2018 |
| CN | 107956708 | | 4/2018 |
| CN | 207169595 | | 4/2018 |
| CN | 207194873 | | 4/2018 |
| CN | 207245674 | | 4/2018 |
| CN | 108034466 | A | 5/2018 |
| CN | 108036071 | A | 5/2018 |
| CN | 108087050 | A | 5/2018 |
| CN | 207380566 | | 5/2018 |
| CN | 108103483 | A | 6/2018 |
| CN | 108179046 | A | 6/2018 |
| CN | 108254276 | A | 7/2018 |
| CN | 108311535 | A | 7/2018 |
| CN | 207583576 | | 7/2018 |
| CN | 207634064 | | 7/2018 |
| CN | 207648054 | | 7/2018 |
| CN | 207650621 | | 7/2018 |
| CN | 108371894 | A | 8/2018 |
| CN | 207777153 | | 8/2018 |
| CN | 108547601 | A | 9/2018 |
| CN | 108547766 | A | 9/2018 |
| CN | 108555826 | A | 9/2018 |
| CN | 108561098 | A | 9/2018 |
| CN | 108561750 | A | 9/2018 |
| CN | 108590617 | A | 9/2018 |
| CN | 207813495 | | 9/2018 |
| CN | 207814698 | | 9/2018 |
| CN | 207862275 | | 9/2018 |
| CN | 108687954 | A | 10/2018 |
| CN | 207935270 | | 10/2018 |
| CN | 207961582 | | 10/2018 |
| CN | 207964530 | | 10/2018 |
| CN | 108789848 | A | 11/2018 |
| CN | 108799473 | | 11/2018 |
| CN | 108868675 | A | 11/2018 |
| CN | 208086829 | | 11/2018 |
| CN | 208089263 | | 11/2018 |
| CN | 208169068 | | 11/2018 |
| CN | 108979569 | A | 12/2018 |
| CN | 109027662 | A | 12/2018 |
| CN | 109058092 | A | 12/2018 |
| CN | 208179454 | | 12/2018 |
| CN | 208179502 | | 12/2018 |
| CN | 208253147 | | 12/2018 |
| CN | 208260574 | | 12/2018 |
| CN | 109114418 | A | 1/2019 |
| CN | 109141990 | A | 1/2019 |
| CN | 208313120 | | 1/2019 |
| CN | 208330319 | | 1/2019 |
| CN | 208342730 | | 1/2019 |
| CN | 208430982 | | 1/2019 |
| CN | 208430986 | | 1/2019 |
| CN | 109404274 | A | 3/2019 |
| CN | 109429610 | A | 3/2019 |
| CN | 109491318 | A | 3/2019 |
| CN | 109515177 | A | 3/2019 |
| CN | 109526523 | A | 3/2019 |
| CN | 109534737 | A | 3/2019 |
| CN | 208564504 | | 3/2019 |
| CN | 208564516 | | 3/2019 |
| CN | 208564525 | | 3/2019 |
| CN | 208564918 | | 3/2019 |
| CN | 208576026 | | 3/2019 |
| CN | 208576042 | | 3/2019 |
| CN | 208650818 | | 3/2019 |
| CN | 208669244 | | 3/2019 |
| CN | 109555484 | A | 4/2019 |
| CN | 109682881 | A | 4/2019 |
| CN | 208730959 | | 4/2019 |
| CN | 208735264 | | 4/2019 |
| CN | 208746733 | | 4/2019 |
| CN | 208749529 | | 4/2019 |
| CN | 208750405 | | 4/2019 |
| CN | 208764658 | | 4/2019 |
| CN | 109736740 | A | 5/2019 |
| CN | 109751007 | A | 5/2019 |
| CN | 208868428 | | 5/2019 |
| CN | 208870761 | | 5/2019 |
| CN | 109869294 | A | 6/2019 |
| CN | 109882144 | A | 6/2019 |
| CN | 109882372 | A | 6/2019 |
| CN | 209012047 | | 6/2019 |
| CN | 209100025 | | 7/2019 |
| CN | 110080707 | A | 8/2019 |
| CN | 110118127 | A | 8/2019 |
| CN | 110124574 | A | 8/2019 |
| CN | 110145277 | A | 8/2019 |
| CN | 110145399 | A | 8/2019 |
| CN | 110152552 | A | 8/2019 |
| CN | 110155193 | A | 8/2019 |
| CN | 110159225 | A | 8/2019 |
| CN | 110159432 | | 8/2019 |
| CN | 110159432 | A | 8/2019 |
| CN | 110159433 | A | 8/2019 |
| CN | 110208100 | A | 9/2019 |
| CN | 110252191 | A | 9/2019 |
| CN | 110284854 | A | 9/2019 |
| CN | 110284972 | A | 9/2019 |
| CN | 209387358 | | 9/2019 |
| CN | 110374745 | A | 10/2019 |
| CN | 209534736 | | 10/2019 |
| CN | 110425105 | A | 11/2019 |
| CN | 110439779 | A | 11/2019 |
| CN | 110454285 | A | 11/2019 |
| CN | 110454352 | A | 11/2019 |
| CN | 110467298 | A | 11/2019 |
| CN | 110469312 | A | 11/2019 |
| CN | 110469314 | A | 11/2019 |
| CN | 110469405 | A | 11/2019 |
| CN | 110469654 | A | 11/2019 |
| CN | 110485982 | A | 11/2019 |
| CN | 110485983 | A | 11/2019 |
| CN | 110485984 | A | 11/2019 |
| CN | 110486249 | A | 11/2019 |
| CN | 110500255 | A | 11/2019 |
| CN | 110510771 | A | 11/2019 |
| CN | 110513097 | A | 11/2019 |
| CN | 209650738 | | 11/2019 |
| CN | 209653968 | | 11/2019 |
| CN | 209654004 | | 11/2019 |
| CN | 209654022 | | 11/2019 |
| CN | 209654128 | | 11/2019 |
| CN | 209656622 | | 11/2019 |

(56) References Cited

FOREIGN PATENT DOCUMENTS

| | | | |
|---|---|---|---|
| CN | 107849130 | B | 12/2019 |
| CN | 108087050 | B | 12/2019 |
| CN | 110566173 | A | 12/2019 |
| CN | 110608030 | A | 12/2019 |
| CN | 110617187 | A | 12/2019 |
| CN | 110617188 | A | 12/2019 |
| CN | 110617318 | A | 12/2019 |
| CN | 209740823 | | 12/2019 |
| CN | 209780827 | | 12/2019 |
| CN | 209798631 | | 12/2019 |
| CN | 209799942 | | 12/2019 |
| CN | 209800178 | | 12/2019 |
| CN | 209855723 | | 12/2019 |
| CN | 209855742 | | 12/2019 |
| CN | 209875063 | | 12/2019 |
| CN | 110656919 | A | 1/2020 |
| CN | 10848028 | A | 2/2020 |
| CN | 107520526 | B | 2/2020 |
| CN | 110787667 | A | 2/2020 |
| CN | 110821464 | A | 2/2020 |
| CN | 110833665 | A | 2/2020 |
| CN | 210049880 | | 2/2020 |
| CN | 210049882 | | 2/2020 |
| CN | 210097596 | | 2/2020 |
| CN | 210105817 | | 2/2020 |
| CN | 210105818 | | 2/2020 |
| CN | 210105993 | | 2/2020 |
| CN | 110873093 | A | 3/2020 |
| CN | 210139911 | | 3/2020 |
| CN | 110947681 | A | 4/2020 |
| CN | 111058810 | A | 4/2020 |
| CN | 111075391 | A | 4/2020 |
| CN | 210289931 | | 4/2020 |
| CN | 210289932 | | 4/2020 |
| CN | 210289933 | | 4/2020 |
| CN | 210303516 | | 4/2020 |
| CN | 211412945 | | 4/2020 |
| CN | 111089003 | A | 5/2020 |
| CN | 111151186 | A | 5/2020 |
| CN | 111167769 | A | 5/2020 |
| CN | 111169833 | A | 5/2020 |
| CN | 111173476 | A | 5/2020 |
| CN | 111185460 | A | 5/2020 |
| CN | 111185461 | A | 5/2020 |
| CN | 111188763 | A | 5/2020 |
| CN | 111206901 | A | 5/2020 |
| CN | 111206992 | A | 5/2020 |
| CN | 111206994 | A | 5/2020 |
| CN | 210449044 | | 5/2020 |
| CN | 210460875 | | 5/2020 |
| CN | 210522432 | | 5/2020 |
| CN | 210598943 | | 5/2020 |
| CN | 210598945 | | 5/2020 |
| CN | 210598946 | | 5/2020 |
| CN | 210599194 | | 5/2020 |
| CN | 210599303 | | 5/2020 |
| CN | 210600110 | | 5/2020 |
| CN | 111219326 | A | 6/2020 |
| CN | 111350595 | A | 6/2020 |
| CN | 210660319 | | 6/2020 |
| CN | 210714569 | | 6/2020 |
| CN | 210769168 | | 6/2020 |
| CN | 210769169 | | 6/2020 |
| CN | 210769170 | | 6/2020 |
| CN | 210770133 | | 6/2020 |
| CN | 210825844 | | 6/2020 |
| CN | 210888904 | | 6/2020 |
| CN | 210888905 | | 6/2020 |
| CN | 210889242 | | 6/2020 |
| CN | 111397474 | A | 7/2020 |
| CN | 111412064 | A | 7/2020 |
| CN | 111441923 | A | 7/2020 |
| CN | 111441925 | A | 7/2020 |
| CN | 111503517 | A | 8/2020 |
| CN | 111515898 | A | 8/2020 |
| CN | 111594059 | A | 8/2020 |
| CN | 111594062 | A | 8/2020 |
| CN | 111594144 | A | 8/2020 |
| CN | 211201919 | | 8/2020 |
| CN | 211201920 | | 8/2020 |
| CN | 211202218 | | 8/2020 |
| CN | 111608965 | A | 9/2020 |
| CN | 111664087 | A | 9/2020 |
| CN | 111677476 | A | 9/2020 |
| CN | 111677647 | A | 9/2020 |
| CN | 111692064 | A | 9/2020 |
| CN | 111692065 | A | 9/2020 |
| CN | 211384571 | | 9/2020 |
| CN | 211397553 | | 9/2020 |
| CN | 211397677 | | 9/2020 |
| CN | 211500955 | | 9/2020 |
| CN | 211524765 | | 9/2020 |
| DE | 4004854 | | 8/1991 |
| DE | 4241614 | | 6/1994 |
| DE | 102009022859 | | 12/2010 |
| DE | 102012018825 | | 3/2014 |
| DE | 102013111655 | | 12/2014 |
| DE | 102015103872 | | 10/2015 |
| DE | 102013114335 | | 12/2020 |
| EP | 0835983 | | 4/1998 |
| EP | 1378683 | | 1/2004 |
| EP | 2143916 | | 1/2010 |
| EP | 2613023 | | 7/2013 |
| EP | 3095989 | | 11/2016 |
| EP | 3211766 | | 8/2017 |
| EP | 3049642 | | 4/2018 |
| EP | 3354866 | | 8/2018 |
| EP | 3075946 | | 5/2019 |
| FR | 2795774 | | 6/1999 |
| GB | 474072 | | 10/1937 |
| GB | 1438172 | | 6/1976 |
| JP | S57135212 | | 2/1984 |
| KR | 20020026398 | | 4/2002 |
| RU | 13562 | | 4/2000 |
| WO | 1993020328 | | 10/1993 |
| WO | 2006025886 | | 3/2006 |
| WO | 2009023042 | | 2/2009 |
| WO | 2011119668 | A1 | 9/2011 |
| WO | 20110133821 | | 10/2011 |
| WO | 2012139380 | | 10/2012 |
| WO | 2013158822 | | 10/2013 |
| WO | PCT/CN2012/074945 | | 11/2013 |
| WO | 2013185399 | | 12/2013 |
| WO | 2015073005 | A1 | 5/2015 |
| WO | 2015158020 | | 10/2015 |
| WO | 2016014476 | | 1/2016 |
| WO | 2016033983 | | 3/2016 |
| WO | 2016078181 | | 5/2016 |
| WO | 2016086138 | A1 | 6/2016 |
| WO | 2016101374 | | 6/2016 |
| WO | 2016112590 | | 7/2016 |
| WO | 2016/186790 | | 11/2016 |
| WO | 2017123656 | A | 7/2017 |
| WO | 2017146279 | | 8/2017 |
| WO | 2017213848 | | 12/2017 |
| WO | 2018031029 | | 2/2018 |
| WO | 2018038710 | | 3/2018 |
| WO | 2018044293 | | 3/2018 |
| WO | 2018044307 | | 3/2018 |
| WO | 2018071738 | | 4/2018 |
| WO | 2018084871 | A1 | 5/2018 |
| WO | 2018101909 | | 6/2018 |
| WO | 2018101912 | | 6/2018 |
| WO | 2018106210 | | 6/2018 |
| WO | 2018106225 | | 6/2018 |
| WO | 2018106252 | | 6/2018 |
| WO | 2018/132106 | | 7/2018 |
| WO | 2018125176 | A1 | 7/2018 |
| WO | 2018152051 | A1 | 8/2018 |
| WO | 2018156131 | | 8/2018 |
| WO | 2018160171 | A1 | 9/2018 |
| WO | 2018075034 | | 10/2018 |
| WO | 2018187346 | | 10/2018 |
| WO | 2018031031 | | 2/2019 |

(56) References Cited

FOREIGN PATENT DOCUMENTS

| | | |
|---|---|---|
| WO | 2019045691 | 3/2019 |
| WO | 2019046680 | 3/2019 |
| WO | 2019060922 | 3/2019 |
| WO | 2019117862 | 6/2019 |
| WO | 2019126742 | 6/2019 |
| WO | 2019147601 | 8/2019 |
| WO | 2019169366 | 9/2019 |
| WO | 2019195651 | 10/2019 |
| WO | 2019200510 | 10/2019 |
| WO | 2019210417 | 11/2019 |
| WO | 2020018068 | 1/2020 |
| WO | 2020046866 | 3/2020 |
| WO | 2020072076 | 4/2020 |
| WO | 2020076569 | 4/2020 |
| WO | 2020097060 | 5/2020 |
| WO | 2020104088 | 5/2020 |
| WO | 2020131085 | 6/2020 |
| WO | 2020211083 | 10/2020 |
| WO | 2020211086 | 10/2020 |
| WO | 2021/038604 | 3/2021 |
| WO | 2021038604 | 3/2021 |
| WO | 2021041783 | 3/2021 |

OTHER PUBLICATIONS

Europump and Hydrualic Institute, Variable Speed Pumping: A Guide to Successful Applications, Elsevier Ltd, 2004.

Capstone Turbine Corporation, Capstone Receives Three Megawatt Order from Large Independent Oil & Gas Company in Eagle Ford Shale Play, Dec. 7, 2010.

Wikipedia, Westinghouse Combustion Turbine Systems Division, https://en.wikipedia.org/wiki/Westinghouse_Combustion_Turbine_Systems_Division, circa 1960.

Wikipedia, Union Pacific GTELs, https://en.wikipedia.org/wiki/Union_Pacific_GTELs, circa 1950.

HCI Jet Frac, Screenshots from YouTube, Dec. 11, 2010. https://www.youtube.com/watch?v=6HjXkdbFaFQ.

AFD Petroleum Ltd., Automated Hot Zone, Frac Refueling System, Dec. 2018.

Eygun, Christiane, et al., URTeC: 2687987, Mitigating Shale Gas Developments Carbon Footprint: Evaluating and Implementing Solutions in Argentina, Copyright 2017, Unconventional Resources Technology Conference.

Walzel, Brian, Hart Energy, Oil, Gas Industry Discovers Innovative Solutions to Environmental Concerns, Dec. 10, 2018.

Frac Shack, Bi-Fuel FracFueller brochure, 2011.

Pettigrew, Dana, et al., High Pressure Multi-Stage Centrifugal Pump for 10,000 psi Frac Pump—HPHPS Frac Pump, Copyright 2013, Society of Petroleum Engineers, SPE 166191.

Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.

Wallace, E.M., Associated Shale Gas: From Flares to Rig Power, Copyright 2015, Society of Petroleum Engineers, SPE-173491-MS.

Williams, C.W. (Gulf Oil Corp. Odessa Texas), The Use of Gas-turbine Engines in an Automated High-Pressure Water-Injection Stations; American Petroleum Institute; API-63-144 (Jan. 1, 1963).

Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).

Porter, John A. (SOLAR Division International Harvester Co.), Modern Industrial Gas Turbines for the Oil Field; American Petroleum Institute; Drilling and Production Practice; API-67-243 (Jan. 1, 1967).

Cooper et al., Jet Frac Porta-Skid—A New Concept in Oil Field Service Pump Equipments[sic]; Halliburton Services; SPE-2706 (1969).

Ibragimov, É.S., Use of gas-turbine engines in oil field pumping units; Chem Petrol Eng; (1994) 30: 530. https://doi.org/10.1007/BF01154919. (Translated from Khimicheskaya i Neftyanoe Mashinostroenie, No. 11, pp. 24-26, (Nov. 1994.).

Kas'yanov et al., Application of gas turbine engines in pumping units complexes of hydraulic fracturing of oil and gas reservoirs; Exposition Oil & Gas; (Oct. 2012) (published in Russian).

American Petroleum Institute. API 674: Positive Displacement Pumps—Reciprocating. 3rd ed. Washington, DC: API Publishing Services, 2010.

American Petroleum Institute. API 616: Gas Turbines for the Petroleum, Chemical, and Gas Industry Services. 5th ed. Washington, DC: Api Publishing Services, 2011.

Karassik, Igor, Joseph Messina, Paul Cooper, and Charles Heald. Pump Handbook. 4th ed. New York: McGraw-Hill Education, 2008.

Weir SPM. Weir SPM General Catalog: Well Service Pumps, Flow Control Products, Manifold Trailers, Safety Products, Post Sale Services. Ft. Worth, TX: Weir Oil & Gas. May 28, 2016. https://www.pumpfundamentals.com/pumpdatabase2/weir-spm-general.pdf.

The Weir Group, Inc. Weir SPM Pump Product Catalog. Ft. Worth, TX: S.P.M. Flow Control, Inc. Oct. 30, 2017. https://manageglobal.weir/assets/files/product%20brochures/SPM_2P140706_Pump_Product_Catalogue_View.pdf.

Shandong Saigao Group Corporation. Q4 (5W115) Quintuplex Plunger Pump. Jinan City, Shandong Province, China: Saigao. Oct. 20, 2014. https://www.saigaogroup.com/product/q400-5w115-quintuplex-plunger-pump.html.

Marine Turbine. Turbine Powered Frac Units. Franklin, Louisiana: Marine Turbine Technologies, 2020.

Rotating Right. Quintuplex Power Pump Model Q700. Edmonton, Alberta, Canada: Weatherford International Ltd. https://www.rotatingright.com/pdf/weatherford/RR%2026-Weatherford%20Model%20Q700.pdf, 2021.

CanDyne Pump Services, Inc. Weatherford Q700 Pump. Calgary, Alberta, Canada: CanDyne Pump Services. Aug. 15, 2015. http://candyne.com/wp-content/uploads/2014/10/181905-94921.q700-quintuplex-pump.pdf.

Arop, Julius Bankong. Geomechanical review of hydraulic fracturing technology. Thesis (M. Eng.). Cambridge, MA: Massachusetts Institute of Technology, Dept. of Civil and Environmental Engineering. Oct. 29, 2013. https://dspace.mit.edu/handle/1721.1/82176.

Rigmaster Machinery Ltd., Model: 2000 RMP-6-PLEX, brochure, downloaded at https://www.rigmastermachinery.com/_files/ugd/431e62_eaecd77091e54af8b13d08396072da67.pdf.

De Gevigney et al., "Analysis of no-load dependent power losses in a planetary gear train by using thermal network method", International Gear Conference 2014: Aug. 26-28, 2014, Lyon, pp. 615-624.

Special-Purpose Couplings for Petroleum, Chemical, and Gas Industry Services, API Standard 671 (4th Edition) (2010).

The Application of Flexible Couplings for Turbomachinery, Jon R.Mancuso et al., Proceedings of the Eighteenthturbomachinery Symposium (1989).

Pump Control With Variable Frequency Drives, Kevin Tory, Pumps & Systems: Advances in Motors and Drives, Reprint from Jun. 2008.

Fracture Design and Stimulation, Mike Eberhard, P.E., Wellconstruction & Operations Technical Workshop Insupport of the EPA Hydraulic Fracturing Study, Mar. 10-11, 2011.

General Purpose vs. Special Purpose Couplings, Jon Mancuso, Proceedings of the Twenty-Third Turbomachinerysymposium (1994).

Overview of Industry Guidance/Best Practices on Hydraulic Fracturing (HF), American Petroleum Institute, © 2012.

API Member Companies, American Petroleum Institute, WaybackMachine Capture, https://web.archive.org/web/20130424080625/http://api.org/globalitems/globalheaderpages/membership/api-member-companies, accessed Jan. 4, 2021.

API's Global Industry Services, American Petroleum Institute, © Aug. 2020.

About API, American Petroleum Institute, https://www.api.org /about, accessed Dec. 30, 2021.

(56) References Cited

OTHER PUBLICATIONS

About API, American Petroleum Institute, WaybackMachine Capture, https://web.archive.org/web/20110422104346 / http://api.org/aboutapi/, captured Apr. 22, 2011.
Publications, American Petroleum Institute, WaybackMachine Capture, https://web.archive.org/web/20110427043936 / http://www.api.org:80/Publications/, captured Apr. 27, 2011.
Procedures for Standards Development, American Petroleum Institute, Third Edition (2006).
WorldCat Library Collections Database Records for API Standard 671 and API Standard 674, https://www.worldcat.org/title/positive-displacement-pumps-reciprocating/oclc/ 858692269&referer=brief_results, accessed Dec. 30, 2021; and https://www.worldcat.org/title/special-purpose-couplings-for-petroleum-chemical-and-gas-industry-services/bclc/871254217&referer=brief_results, accessed Dec. 22, 2021.
2011 Publications and Services, American Petroleum Institute (2011).
Standards, American Petroleum Institute, WaybackMachine Capture, https://web.archive.org/web/20110207195046/ http:/www.api.org/Standards/, captured Feb. 7, 2011; and https://web.archive.org/web/20110204112554/http://global.ihs.com/?RID=API1, captured Feb. 4, 2011.
IHS Markit Standards Store, https://global.ihs.com/doc_detail.cfm?document_name=API%20STD%20674&item_s_key=00010672#doc-detail-history-anchor, accessed Dec. 30, 2021; and https://global.ihs.com/doc_detail.cfm?&input_doc_number=671&input_doc_title=&document_name=API%20STD%20671&item_s_key=00010669&item_key_date=890331&origin=DSSC, accessed Dec. 30, 2021.
Dziubak, Tadeusz, "Experimental Studies of Dust Suction Irregularity from Multi-Cyclone Dust Collector of Two-Stage Air Filter", Energies 2021, 14, 3577, 28 pages.
Researchgate, Answer by Byron Woolridge, found at https://www.researchgate.net/post/How_can_we_improve_the_efficiency_of_the_gas_turbine_cycles, Jan. 1, 2013.
Filipović, Ivan, Preliminary Selection of Basic Parameters of Different Torsional Vibration Dampers Intended for use in Medium-Speed Diesel Engines, Transactions of Famena XXXVI-3 (2012).
Marine Turbine Technologies, 1 MW Power Generation Package, http://marineturbine.com/power-generation, 2017.
Business Week: Fiber-optic cables help fracking, cablinginstall.com. Jul. 12, 2013. https://www.cablinginstall.com/cable/article/16474208/businessweek-fiberoptic-cables-help-fracking.
Fracking companies switch to electric motors to power pumps, iadd-intl.org. Jun. 27, 2019. https://www.iadd-intl.org/articles/fracking-companies-switch-to-electric-motors-to-power-pumps/.
The Leader in Frac Fueling, suncoastresources.com. Jun. 29, 2015. https://web.archive.org/web/20150629220609/https://www.suncoastresources.com/oilfield/fueling-services/.
Mobile Fuel Delivery, atlasoil.com. Mar. 6, 2019. https://www.atlasoil.com/nationwide-fueling/onsite-and-mobile-fueling.
Frac Tank Hose (FRAC), 4starhose.com. Accessed: Nov. 10, 2019. http://www.4starhose.com/product/frac_tank_hose_frac.aspx.
Plos One, Dynamic Behavior of Reciprocating Plunger Pump Discharge Valve Based on Fluid Structure Interaction and Experimental Analysis. Oct. 21, 2015.
FMC Technologies, Operation and Maintenance Manual, L06 Through L16 Triplex Pumps Doc No. OMM50000903 Rev: E p. 1 of 66. Aug. 27, 2009.
Gardner Denver Hydraulic Fracturing Pumps GD 3000 https://www.gardnerdenver.com/en-us/pumps/triplex-fracking-pump-gd-3000.
Lekontsev, Yu M., et al. "Two-side sealer operation." Journal of Mining Science 49.5 (2013): 757-762.
Tom Hausfeld, GE Power & Water, and Eldon Schelske, Evolution Well Services, TM2500+ Power for Hydraulic Fracturing.
FTS International's Dual Fuel Hydraulic Fracturing Equipment Increases Operational Efficiencies, Provides Cost Benefits, Jan. 3, 2018.
CNG Delivery, Fracturing with natural gas, dual-fuel drilling with CNG, Aug. 22, 2019.
PbNG, Natural Gas Fuel for Drilling and Hydraulic Fracturing, Diesel Displacement / Dual Fuel & Bi-Fuel, May 2014.
Integrated Flow, Skid-mounted Modular Process Systems, Jul. 15, 2017, https://ifsolutions.com/why-modular/.
Cameron, A Schlumberger Company, Frac Manifold Systems, 2016.
ZSi-Foster, Energy | Solar | Fracking | Oil and Gas, Aug. 2020, https://www.zsi-foster.com/energy-solar-fracking-oil-and-gas.html.
JBG Enterprises, Inc., WS-Series Blowout Prevention Safety Coupling—Quick Release Couplings, Sep. 11, 2015, http://www.jgbhose.com/products/WS-Series-Blowout-Prevention-Safety-Coupling.asp.
Halliburton, Vessel-based Modular Solution (VMS), 2015.
Chun, M. K., H. K. Song, and R. Lallemand. "Heavy duty gas turbines in petrochemical plants: Samsung's Daesan plant (Korea) beats fuel flexibility records with over 95% hydrogen in process gas." Proceedings of PowerGen Asia Conference, Singapore. 1999.
Wolf, Jürgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.
Ginter, Timothy, and Thomas Bouvay. "Uprate options for the MS7001 heavy duty gas turbine." GE paper GER-3808C, GE Energy 12 (2006).
Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.
Ecob, David J., et al. "Design and Development of a Landfill Gas Combustion System for the Typhoon Gas Turbine." ASME 1996 International Gas Turbine and Aeroengine Congress and Exhibition. American Society of Mechanical Engineers Digital Collection, 1996.
II-VI Marlow Industries, Thermoelectric Technologies in Oil, Gas, and Mining Industries, blog.marlow.com (Jul. 24, 2019).
B.M. Mahlalela, et al., .Electric Power Generation Potential Based on Waste Heat and Geothermal Resources in South Africa, pangea.stanford.edu (Feb. 11, 2019).
"Department of Energy, United States of America, The Water-Energy Nexus: Challenges and Opportunities" purenergypolicy.org (Jun. 2014).
Ankit Tiwari, Design of a Cooling System for a Hydraulic Fracturing Equipment, The Pennsylvania State University, The Graduate School, College of Engineering, 2015.
Jp Yadav et al., Power Enhancement of Gas Turbine Plant by Intake Air Fog Cooling, Jun. 2015.
Mee Industries: Inlet Air Fogging Systems for Oil, Gas and Petrochemical Processing, Verdict Media Limited Copyright 2020.
M. Ahmadzadehtalatapeh et al.Performance enhancement of gas turbine units by retrofitting with inlet air cooling technologies (IACTs): an hour-by-hour simulation study, Journal of the Brazilian Society of Mechanical Sciences and Engineering, Mar. 2020.
Advances in Popular Torque-Link Solution Offer OEMs Greater Benefit, Jun. 21, 2018.
Emmanuel Akita et al., Mewbourne College of Earth & Energy, Society of Petroleum Engineers; Drilling Systems Automation Technical Section (DSATS); 2019.
PowerShelter Kit II, nooutage.com, Sep. 6, 2019.
EMPengineering.com, HEMP Resistant Electrical Generators / Hardened Structures HEMP/GMD Shielded Generators, Virginia, Nov. 3, 2012.
Blago Minovski, Coupled Simulations of Cooling and Engine Systems for Unsteady Analysis of the Benefits of Thermal Engine Encapsulation, Department of Applied Mechanics, Chalmers University of Technology Goteborg, Sweden 2015.
J. Porteiro et al., Feasibility of a new domestic CHP trigeneration with heat pump: II. Availability analysis. Design and development, Applied Thermal Engineering 24 (2004) 1421-1429.
ISM, What is Cracking Pressure, 2019.
Swagelok, The right valve for controlling flow direction? Check, 2016.
Technology.org, Check valves how do they work and what are the main type, 2018.

(56) References Cited

OTHER PUBLICATIONS

AFGlobal Corporation, Durastim Hydraulic Fracturing Pump, A Revolutionary Design for Continuous Duty Hydraulic Fracturing, 2018.
SPM® QEM 5000 E-Frac Pump Specification Sheet, Weir Group (2019) ("Weir 5000").
Green Field Energy Services Natural Gas Driven Turbine Frac Pumps HHP Summit Presentation, Yumpu (Sep. 2012), https://www.yumpu.com/en/document/read/49685291/turbine-frac-pump-assembly-hhp ("Green Field").
Dowell B908 "Turbo-Jet" Operator's Manual.
Jereh Debut's Super-power Turbine Fracturing Pump, Leading the Industrial Revolution, Jereh Oilfield Services Group (Mar. 19, 2014), https://www.prnewswire.com/news-releases/jereh-debuts-super-power-turbine-fracturing-pump-leading-the-industrial-revolution-250992111.html.
Jereh Apollo 4500 Turbine Frac Pumper Finishes Successful Field Operation in China, Jereh Group (Feb. 13, 2015), as available on Apr. 20, 2015, https://web.archive.org/web/20150420220625/https://www. prnewswire.com/news-releases/jereh-apollo-4500-turbine-frac-pumper-finishes-successful-field-operation-in-china-300035829.html.
35% Economy Increase, Dual-fuel System Highlighting Jereh Apollo Frac Pumper, Jereh Group (Apr. 13, 2015), https://www.jereh.com/en/news/press-release/news-detail-7345.htm.
Hydraulic Fracturing: Gas turbine proves successful in shale gas field operations, Vericor (2017), https://www.vericor.com/wp-content/ uploads/2020/02/7.-Fracing-4500hp-Pump-China-En.pdf ("Vericor Case Study").
Jereh Apollo Turbine Fracturing Pumper Featured on China Central Television, Jereh Group (Mar. 9, 2018), https://www.jereh.com/en/news/press-release/news-detail-7267.htm.
Jereh Unveiled New Electric Fracturing Solution at OTC 2019, Jereh Group (May 7, 2019), as available on May 28, 2019, https://web.archive.org/web/20190528183906/https://www.prnewswire .com/news-releases/jereh-unveiled-new-electric-fracturing-solution-at-otc-2019-300845028.html.
Jereh Group, Jereh Fracturing Unit, Fracturing Spread, YouTube (Mar. 30, 2015), https://www.youtube.com/watch? v=PlkDbU5dE0o.
Transcript of Jereh Group, Jereh Fracturing Unit, Fracturing Spread, YouTube (Mar. 30, 2015).
Jereh Group, Jereh Fracturing Equipment. YouTube (Jun. 8, 2015), https://www.youtube.com/watch?v=m0vMiq84P4Q.
Transcript of Jereh Group, Jereh Fracturing Equipment, YouTube (Jun. 8, 2015), https://www.youtube.com/watch?v=m0vMiq84P4Q.
Ferdinand P. Beer et al., Mechanics of Materials (6th ed. 2012).
Weir Oil & Gas Introduces Industry's First Continuous Duty 5000-Horsepower Pump, Weir Group (Jul. 25, 2019), https://www.global. weir/newsroom/news-articles/weir-oil-and-gas-introduces-industrys-first-continuous-duty-5000-horsepower-pump/.
2012 High Horsepower Summit Agenda, Natural Gas for High Horsepower Applications (Sep. 5, 2012).
Review of HHP Summit 2012, Gladstein, Neandross & Associates https://www.gladstein.org/gna-conferences/high-horsepower-summit-2012/.
"Green Field Energy Services Deploys Third New Hydraulic Fracturing System," Green Field Energy Services, Inc. (Jul. 11, 2012), https://www.prnewswire.com/news-releases/green-field-energy-services-deploys-third-new-hydraulic-fracturing-spread-162113425.
Karen Boman, Turbine Technology Powers Green Field Multi-Fuel Frack Pump, Rigzone (Mar. 7, 2015), as available on Mar. 14, 2015, https://web.archive.org/web/20150314203227/https://www.rigzone.co m/news/oil-gas/a/124883/Turbine_Technology_Powers_Green_Field_MultiFuel_Frack_Pump.
"Turbine Frac Units," WMD Squared (2012), https://wmdsquared.com/ work/gfes-turbine-frac-units/.
Leslie Turj, Green Field asset sale called 'largest disposition industry has seen,' The INDsider Media (Mar. 19, 2014), http://theind.com/ article-16497-green-field-asset-sale-called-%E2%80%98largest-disposition-industry-has-seen%60.html.
"Honghua developing new-generation shale-drilling rig, plans testing of frac pump"; Katherine Scott; Drilling Contractor; May 23, 2013; accessed at https://www.drillingcontractor.org/honghua-developing-new-generation-shale-drilling-rig-plans-testing-of-frac-pump-23278.
Final written decision of PGR2021-00102 dated Feb. 6, 2023.
Final written decision of PGR2021-00103 dated Feb. 6, 2023.

* cited by examiner

METHODS FOR DETECTION AND MITIGATION OF WELL SCREEN OUT

PRIORITY CLAIM

This is a continuation of U.S. Non-Provisional application Ser. No. 17/355,920, filed Jun. 23, 2021, titled "METHODS FOR DETECTION AND MITIGATION OF WELL SCREEN OUT," which is continuation of U.S. Non-Provisional application Ser. No. 17/303,841, filed Jun. 9, 2021, titled "METHODS AND SYSTEMS FOR DETECTION AND MITIGATION OF WELL SCREEN OUT," now U.S. Pat. No. 11,208,881, issued Dec. 28, 2021, which is a continuation of U.S. Non-Provisional application Ser. No. 17/182,408, filed Feb. 23, 2021, titled "METHODS FOR DETECTION AND MITIGATION OF WELL SCREEN OUT," now U.S. Pat. No. 11,066,915, issued Jul. 20, 2021, which claims priority to and the benefit of U.S. Provisional Application No. 62/705,050, filed Jun. 9, 2020, titled "METHODS AND SYSTEMS FOR DETECTION AND MITIGATION OF WELL SCREEN OUT," the disclosures of which are incorporated herein by reference in their entireties.

TECHNICAL FIELD

The application generally relates to mobile power units and, more specifically, drive equipment and methods for usage, installation on, and controls for mobile fracturing transportation platforms.

BACKGROUND

Hydrocarbon exploration and energy industries employ various systems and operations to accomplish activities including drilling, formation evaluation, stimulation and production. Measurements such as temperature, pressure, and flow measurements are typically performed to monitor and assess such operations. During such operations, problems or situations may arise that may have a detrimental effect on the operation, equipment, and/or safety of operators. For example, during a stimulation or fracturing operation, screen out conditions may occur, which may cause rapid pressure increases that may compromise the operation and/or damage equipment.

SUMMARY

Embodiment of systems, methods, and controllers that control the operation to detect and mitigate screen outs such that screen outs are avoided, for example, may save time, may increase awareness of conditions within the well, and may increase safety at a wellsite hydraulic fracturing pumper system. For example, Applicant has recognized that a controller detecting and mitigating screen outs may avoid packing of a well and avoid the need for additional operations to stimulate a well, e.g., wire line operations. In addition, a controller that avoids rapid pressure increases associated with screen outs may reduce stress on fracturing equipment including power end assemblies, shocking of prime movers and gearing systems associated therewith, and piping of the well. Further, the methods and systems detailed herein may prevent energy release in the form of release pressure through a pressure relief valve, e.g., a wellhead or manifold pressure relief valve. Avoiding pressure release from a pressure valve may also increase the safety of the wellhead, for example, by not over pressuring a wellhead.

Applicant also has recognized that a controller that detects and mitigates screen outs may also increase awareness of conditions within the well by detecting a rate of pressure increase more accurately and at a more frequent rate than with manual control. In some embodiments, the controller may prewarn by one or more tiers of pressure increase rates such that an operator may manually adjust proppant concentration or take other measures to avoid screen outs before the controller intervenes as would be appreciated by those skilled in the art. The controller may also control the blender and the fracturing pump with a single command such that an operator is not required to sequence both elements in a safe manner to avoid damage to equipment, e.g., via cavitation, and to avoid screen out.

In accordance with an embodiment of the present disclosure, a method of detecting and mitigating well screen out at a fracturing well site during hydrocarbon production may include operating a fracturing pump to supply fluid at a discharge rate to a wellhead at a fracturing well site. The method also may include operating a blender positioned to deliver a blend of proppant and fluid to the fracturing pump. A fluid pressure of the fluid supplied to the wellhead may be measured and a fluid pressure increase rate of the fluid may be determined from the fluid pressure. The fluid pressure increase rate may be compared to a preselected increase rate indicative of a potential well screen out. When the fluid pressure increase rate exceeds the preselected increase rate and the fluid pressure is within a preselected percentage of a maximum wellhead pressure of the well head, the discharge rate of the fracturing pumps may be incrementally decreased until the fluid pressure increase rate is stabilized. Stabilizing the fluid pressure increase rate may include the fluid pressure increase rate being equal to or less than zero.

In accordance with another embodiment of the present disclosure, a wellsite hydraulic fracturing pumper system may include one or more fracturing pumps, a blender, a pressure transducer, and a controller. The one or more fracturing pumps may be configured to provide fluid to a wellhead when positioned a hydrocarbon well site. The blender may be configured to provide fluid and proppant to the one or more fracturing pumps. The pressure transducer may be positioned adjacent an output of the one or more fracturing pumps or at the wellhead. The pressure transducer may be configured to measure a fluid pressure of the fluid provided to the wellhead. The controller may control the one or more fracturing pumps and the blender. The controller may be positioned in signal communication with the pressure transducer such that the controller receives the fluid pressure of the fluid provided to the wellhead. The controller may include memory, a processor to process data, and a screen out detection and mitigation protocol program stored in the memory and responsive to the process and in which the protocol of the controller may incrementally decrease a discharge rate of the one or more fracturing pumps and a flow rate of the blender in response to a fluid pressure increase rate of the fluid suppled to the wellhead being greater than a preselected increase rate and the fluid pressure of the fluid provided to the wellhead being greater than a preselected percentage of a maximum wellhead pressure until the fluid pressure is stabilized.

In yet another embodiment of the present disclosure, a controller for a hydraulic fracturing pumper system may include a pressure input, a first control output, and a second control output. The pressure input may be in signal communication with a pressure transducer that measures a fluid pressure of a fluid being provided to a wellhead. The first control output may be in signal communication with a fracturing pump such that the controller provides pump control signals to the fracturing pump to control a discharge rate of the fracturing pump. The second control output may be in signal communication with a blender such that the controller provides blender control signals to the blender to control a flow rate of the blender and delivery of a proppant from the blender. The controller may be configured to calculate a fluid pressure increase rate of the fluid pressure, compare the fluid pressure increase rate of the fluid pressure to a preselected increase rate, and incrementally decrease a discharge rate of the fracturing pump and a flow rate of the blender when the fluid pressure increase rate is greater than the preselected increase rate and the fluid pressure is within a preselected percentage of a maximum wellhead pressure of the wellhead until the fluid pressure of the fluid is supplied to the wellhead is stabilized.

Those skilled in the art will appreciate the benefits of various additional embodiments reading the following detailed description of the embodiments with reference to the below-listed drawing figures. It is within the scope of the present disclosure that the above-discussed embodiments and aspects be provided both individually and in various combinations.

BRIEF DESCRIPTION OF THE DRAWINGS

The accompanying drawings, which are included to provide a further understanding of the embodiments of the present disclosure, are incorporated in and constitute a part of this specification, and together with the detailed description, serve to explain the principles of the embodiments discussed herein. The present disclosure may be more readily described with reference to the accompanying drawings.

Corresponding parts are designated by corresponding reference numbers throughout the drawings.

DETAILED DESCRIPTION

Figure 1:
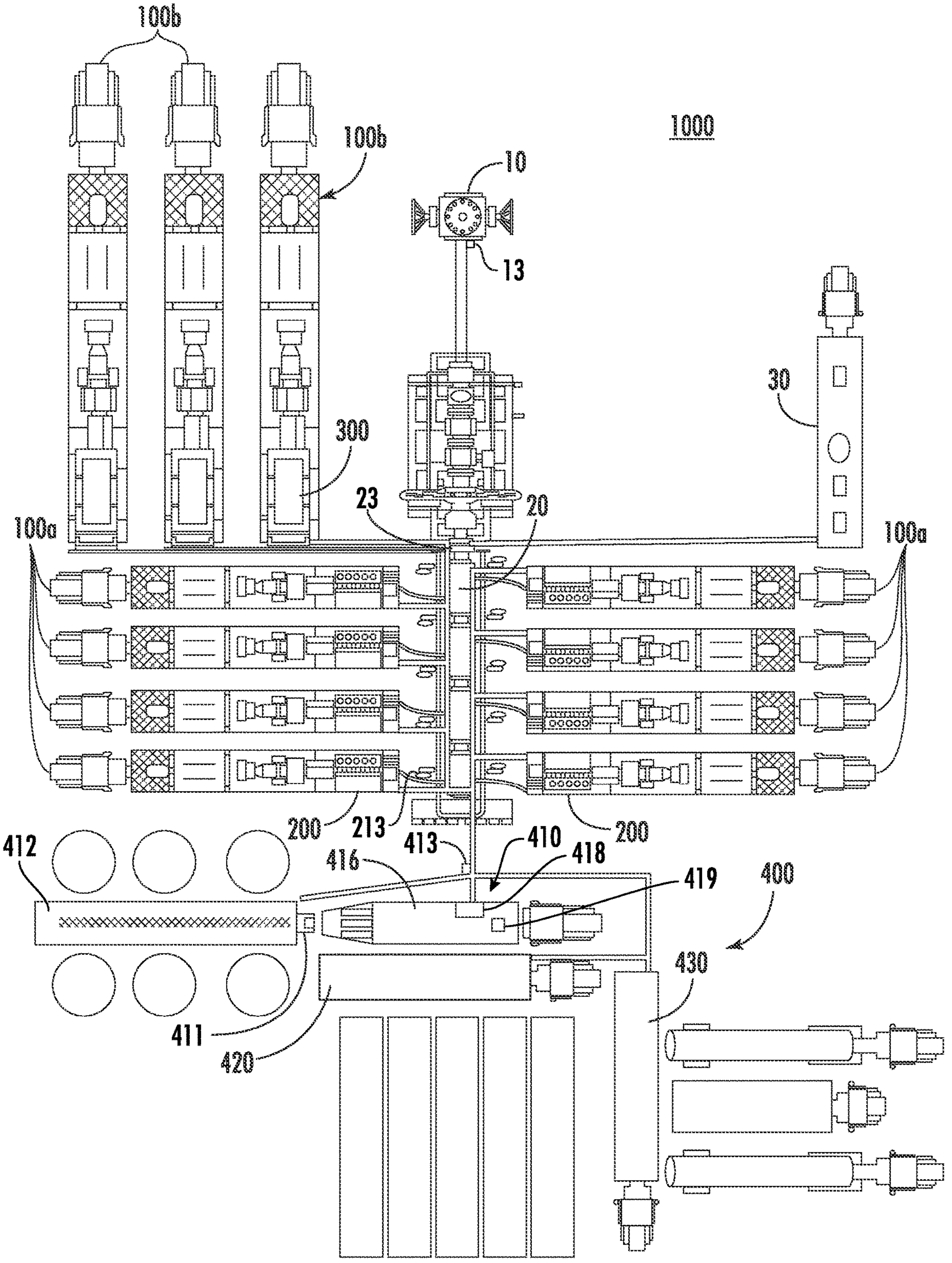
FIG. 1 is a schematic view of a wellsite hydraulic fracturing pumper system according to an embodiment of the disclosure.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect may be combined with features from any other embodiment or aspect in any appropriate combination. For example, any individual or collective features of method aspects or embodiments may be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

Embodiments of the present disclosure are directed to methods and systems for detecting and mitigating well screen outs during the operations of wellsite hydraulic fracturing pumping systems during the production of hydrocarbons. The methods and systems detailed herein may be executed on a controller that provides alerts or alarms to an operator of a potential well screen out and may intervene to prevent the fluid pressure provided to the well from exceeding a maximum well pressure.

FIG. 1 illustrates an exemplary wellsite hydraulic fracturing pumper system 1000 that is provided in accordance with an embodiment of the present disclosure. The wellsite hydraulic fracturing pumper system 1000 includes a plurality of mobile power units 100 arranged around a wellhead 10 to supply the wellhead 10 with high-pressure fracturing fluids and recover oil and/or gas from the wellhead 10 as will be understood by those skilled in the art. As shown, some of the mobile power units 100, e.g., mobile power units 100*a*, drive a hydraulic fracturing pump 200 that discharges high pressure fluid to a manifold 20 such that the high pressure fluid is provided to the wellhead 10. Additionally, some of the mobile power units 100, e.g., mobile power units 100*b*, drive an electrical generator 300 that provides electrical power to the wellsite hydraulic fracturing pumper system 1000.

The wellsite hydraulic fracturing pumper system 1000 also includes a blender unit 410, a hydration unit 420, or a chemical additive unit 430 which may be referred to generally as backside equipment 400. Specifically, the blender unit 410 provides a flow of fluid to the fracturing pumps 200 which is pressurized by and discharged from the fracturing pumps 200 into the manifold 20. The blender unit 410 may include one or more screw conveyors 412 that provides proppant to a mixer 416 of the blender unit 410. The blender unit 410 also includes a discharge pump 418 that draws fluid from the mixer 416 such that a flow of fluid is provided from the blender unit 410 to the fracturing pumps 200. The fluid from the mixer 416 may include proppant provided by the screw conveyors 412 and/or chemicals for the fluid of the fracturing pumps 200. When blender unit 410 provides proppant to the fracturing pumps 200, the proppant is in a slurry which may be considered a fluid as will be understood by those skilled in the art.

The wellsite hydraulic fracturing pumper system 1000 includes a supervisory control unit that monitors and controls operation of the mobile power units 100*a* driving the fracturing pumps 200, the mobile power units 100*b* driving electrical generators 300, and the units 410, 420, 430 and may be referred to generally as controller 30. The controller 30 may be a mobile control unit in the form of a trailer or a van, as appreciated by those skilled in the art. As used herein, the term "fracturing pump" may be used to refer to one or more of the hydraulic fracturing pumps 200 of the hydraulic fracturing pumper system 1000. In some embodiments, all of the hydraulic fracturing pumps 200 are controlled by the controller 30 such that to an operator of the controller 30, the hydraulic fracturing pumps 200 are controlled as a single pump or pumping system.

The controller 30 is in signal communication with the blender unit 410 to control the delivery of the proppant to the mixer 416 and a flow rate of fluid from the discharge pump 418 to the fracturing pumps 200. The controller 30 is also in signal communication with the fracturing pumps 200 to control a discharge rate of fluid from the fracturing pumps 200 into the manifold 20. In addition, the controller 30 is in signal communication with one or more sensors of the wellsite hydraulic fracturing pumper system 1000 to receive measurements or data with respect to the fracturing operation. For example, the controller 30 receives a measurement of pressure of the fluid being delivered to the wellhead 10 from a wellhead pressure transducer 13, a manifold pressure transducer 23, or a pump output pressure transducer 213. The wellhead pressure transducer 13 is disposed at the wellhead 10 to measure a pressure of the fluid at the wellhead 10. The manifold pressure transducer 23 is shown at an end of the manifold 20. However, as understood by those skilled in the art, the pressure within the manifold 20 is substantially the same throughout the entire manifold 20 such that the manifold pressure transducer 23 may be disposed anywhere within the manifold 20 to provide a pressure of the fluid being delivered to the wellhead 10. The pump output pressure transducer 213 is disposed adjacent an output of one of the fracturing pumps 200 which is in fluid communication with the manifold 20 and thus, the fluid at the output of the fracturing pumps 200 is at substantially the same pressure as the fluid in the manifold 20 and the fluid being provided to the wellhead 10. Each of the fracturing pumps 200 may include a pump output pressure transducer 213 and the controller 30 may calculate the fluid pressure provided to the wellhead 10 as an average of the fluid pressure measured by each of the pump output pressure transducers 213.

The controller 30 is also in signal communication with sensors disposed about the blender unit 410. For example, the blender unit 410 may include a blender screw encoder/pickup 411 that provides a rotation rate of the screw conveyors 412 of the blender unit 410 which provide proppant to the mixer 416 such that proppant is provided to the fracturing pumps 200. When the screw conveyors 412 are not active or rotating, proppant is not being added to the mixer 416 such that no proppant is being provided to the fracturing pumps 200. The blender unit 410 may include a blender flow meter 413 that measures a flow of fluid from the blender unit 410 to the fracturing pumps 200.

As used herein, "signal communication" refers to electric communication such as hard wiring two components together or wireless communication, as understood by those skilled in the art. For example, wireless communication may be Wi-Fi®, Bluetooth®, ZigBee, or forms of near field communications. In addition, signal communication may include one or more intermediate controllers or relays disposed between elements that are in signal communication with one another. For example, a pump output pressure transducer 213 may be in direct electrical communication with a pump controller (not explicitly shown) and the pump controller may be in direct electrical communication or wireless communication with a master controller (not explicitly shown) of the mobile power unit 100 which is in electrical or wireless communication with the controller 30.

Figure 2:
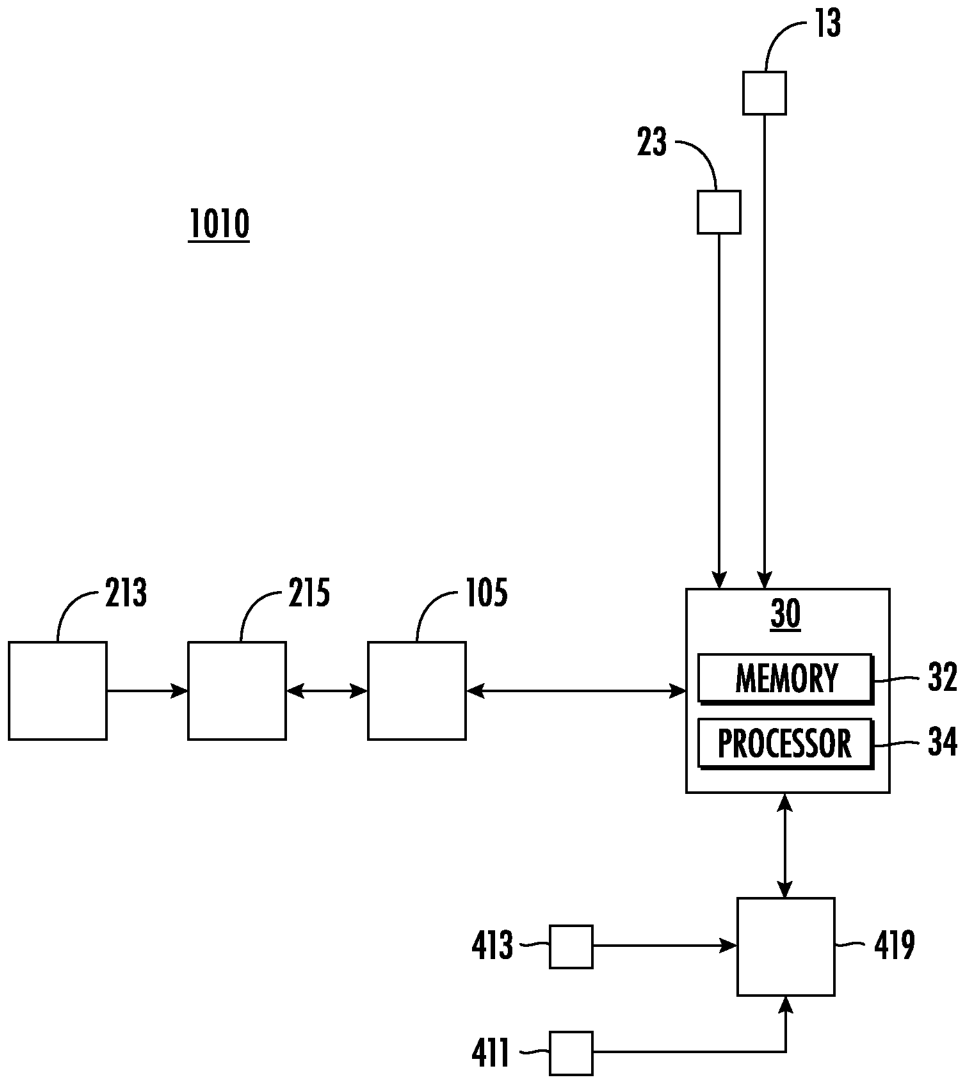
FIG. 2 is a schematic view of a control system of the wellsite hydraulic fracturing pumper system of FIG. 1.

FIG. 2 illustrates a schematic of a control system for the wellsite hydraulic fracturing pumper system 1000 referred to generally as a control system 1010. The control system 1010 includes the controller 30 that is in signal communication with the wellhead pressure transducer 13, a manifold pressure transducer 23, and a pump output transducer 213. The controller 30 includes memory 32 and a processor 34. The memory 32 may be loaded or preloaded with programs, e.g., detection and mitigation protocol programs as detailed below, that are executed on the processor 34. The pump output transducer 213 may be in direct signal or electrical communication with a pump controller 215 which may be in direct signal or electrical communication with a mobile power unit controller 105 with the mobile power unit controller 105 in direct signal or electrical communication with the controller 30 such that the pump output transducer 213 is in signal communication with the controller 30. In some embodiments, the pump output transducer is in direct signal communication with the controller 30. The pump controller 215 is configured to control the fracturing pump 200 in response to commands signals provided by the controller 30 or the mobile power unit controller 30. The pump controller 215 may include a pump profiler that records events experienced by the fracturing pump 200. The recorded events may be used to schedule maintenance of the fracturing pump 200.

The control system 1010 may include a blender controller 419, a blender flow meter 413, and a blender screw encoder/pickup 411. The blender flow meter 413 and the blender screw encoder/pickup 411 may be in direct signal or electrical communication with the blender controller 419 which may be in direct signal or electrical communication with the controller 30 such that the blender flow meter 413 and the blender screw encoder/pickup 411 are in signal communication with the controller 30.

Figure 3:
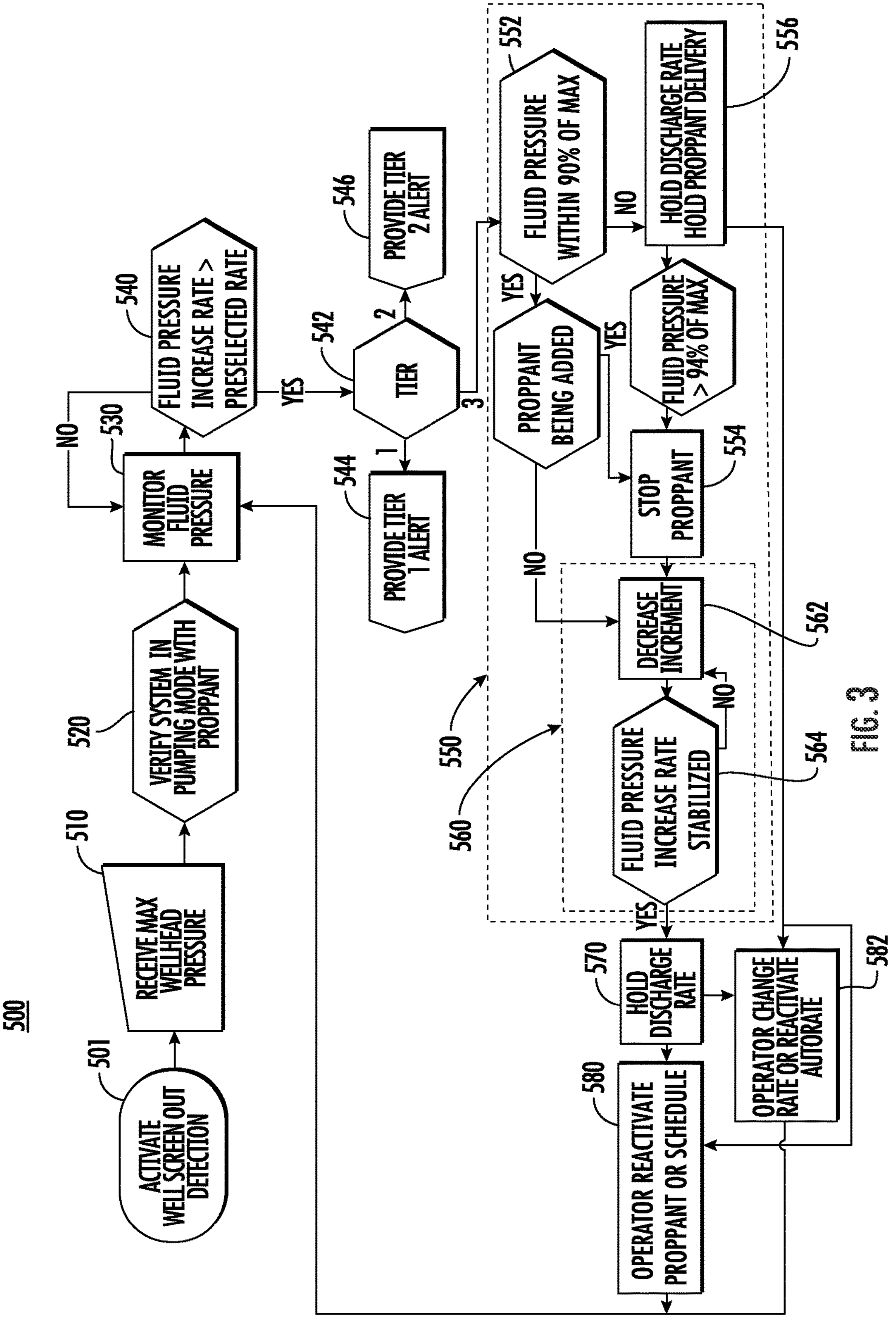
FIG. 3 is a flowchart of a method of detecting and mitigating a well screen out of a well according to an embodiment of the present disclosure.

FIG. 3 illustrates a method of detecting and mitigating well screen out for a hydraulic fracturing operation is described in accordance with embodiments of the present disclosure and is referred to generally as method 500. The method 500 is detailed with reference to the wellsite hydraulic fracturing pumper system 1000 and the control system 1010 of FIGS. 1 and 2. Unless otherwise specified, the actions of the method 500 may be completed within the controller 30. Specifically, the method 500 may be included in one or more programs or protocols loaded into the memory 32 of the controller 30 and executed on the processor 34. The well screen out protocol is activated (Step 501) either automatically when the controller 30 is started or may be manually activated by an operator. When well screen out protocol is activated, a maximum wellhead pressure is provided to the controller 30 (Step 510). The maximum wellhead pressure may be input by an operator into a human interface of the controller 30 or may be a preselected pressure programmed into the controller 30. When the maximum wellhead pressure is provided by an operator, the controller may verify that the inputted maximum wellhead pressure is within a preselected range. If the inputted maximum wellhead pressure is outside of the preselected range, the controller 30 may display an alarm or reject the inputted maximum wellhead pressure and request another value be inputted by the operator and verify the new inputted maximum wellhead pressure until the inputted maximum wellhead pressure is within the preselected range. The preselected range may be in a range of up to 15,000 per square inch (psi), for example, as will be understood by those skilled in the art.

With the maximum wellhead pressure, the controller 30 verifies that the wellsite hydraulic fracturing pumper system 1000 is in a pumping mode in which at least one of the fracturing pumps 200 is active and that the blender unit 410 is adding proppant to the fluid provided to the fracturing pumps 200 (Step 520). The controller 30 may verify the blender unit 410 is adding proppant from verifying that one or more of the screw conveyors 412 is rotating via the blender screw encoder/pickups 411. If either the wellsite hydraulic fracturing pumper system 1000 is not in a pumping mode or that the blender unit 410 is not adding proppant to the fluid being supplied to the fracturing pumps 200 the method 500 is terminated or deactivated. The method 500 may be reactivated manually or when the fracturing pumps 200 and the blender unit 410 are activated to provide fluid including proppant to the wellhead 10.

Continuing to refer to FIG. 3, when the fracturing pumps 200 and the blender unit 410 are activated to provide fluid including proppant to the wellhead 10, the controller 30 monitors a fluid pressure of fluid being provided to the wellhead 10 to detect a potential screen out within the well (Step 530). The fluid pressure of the fluid provided to the wellhead 10 may be monitored from the wellhead pressure transducer 13, the manifold pressure transducer 23, the pump output pressure transducers 213, or combinations thereof. To detect for a potential screen out within the well, the controller 30 monitors a rate of increase of the fluid pressure of fluid being provided to the wellhead 10 which is referred to as fluid pressure increase rate. The fluid pressure increase rate may be calculated by comparing the fluid pressure at a first time $P(t_1)$ and fluid pressure at a second time $P(t_2)$ such that the fluid pressure increase rate is calculated as:

$$\text{Fluid Pressure Increase Rate} = \frac{\Delta P}{\Delta t} = \frac{P(t_2) - P(t_1)}{t_2 - t_1}.$$

The fluid pressure may be sampled at a rate in a range of 1 Hertz (Hz) to 300 Hz and the fluid pressure increase rate may be smoothed by taking an average of 2 samples to 100 samples to prevent a single spike of a sample or an erroneous sample from triggering the detection of a potential screen out.

The calculated fluid pressure increase rate is compared to a preselected increase rate to determine if there is a potential for screen out within the well (Step 540). The preselected increase rate may be an increase rate that is entered by an operator or may be preprogrammed into the controller 30. The preselected increase rate may be based on historical data of well screen out from other wells, for example, or specific to the well being monitored, as will be understood by those skilled in the art. When the fluid pressure increase rate is below the preselected increase rate, the controller 30 continues to monitor the fluid pressure increase rate while proppant is being added to the fluid provided to the fracturing pumps 200.

When the fluid pressure increase rate meets or exceeds the preselected increase rate, a tier of the fluid pressure increase rate may be determined (Step 542). For example, when the fluid pressure increase rate is in a first range of 600 psi/s to 800 psi/s such that the fluid pressure increase rate is a Tier 1 Potential Screen Out and the potential for screen out may be minor. When the fluid pressure increase rate is a Tier 1 Potential Screen Out, the controller 30 provides an alert or message to an operator that the fluid pressure increase rate is high or there is a potential for screen out (Step 544). The message or alert may be a warning light, a message on a screen, an audible alert, or combinations thereof. In response to the alert or message, an operator may take no action, reduce or stop the addition of proppant to the fluid provided to the fracturing pumps 200, or reduce a discharge rate of the fracturing pumps 200.

Continuing with the example, when the fluid pressure increase rate is in a second range of 800 psi/s to 1200 psi/s such that the fluid pressure increase rate is a Tier 2 Potential Screen Out and the potential for screen out is high. When the fluid pressure increase rate is a Tier 2 Potential Screen Out, the controller 30 provides an alarm or message to an operator that the fluid pressure increase rate is high or potential screen out is high (Step 546). The message or alarm may be a warning light, a message on a screen, an audible alert, or combinations thereof and is escalated from the message or alert provided for a Tier 1 Potential Screen Out. In response to the alarm or message, an operator may take no action, reduce or stop the addition of proppant to the fluid provided to the fracturing pumps 200, or reduce a discharge rate of the fracturing pumps 200.

When the fluid pressure increase rate is above the second range, e.g., 1200 psi/s, the potential for screen out is extremely high such that the fluid pressure increase rate is a Tier 3 Potential Screen Out and a screen out is likely. When the fluid pressure increase rate is a Tier 3 Potential Screen Out, a screen out is likely and the controller 30 enters an intervention or mitigation mode to prevent screen out and prevent or reduce damage to the well and the wellsite hydraulic fracturing pumper system 1000 by the mitigation process 550. When the controller 30 begins the mitigation process 550, the controller 30 provides an alert or message to an operator that the mitigation process 550 is running. The message or alert may be a warning light, a message on a screen, an audible alert, or combinations thereof and is escalated from the message or alert provided for a Tier 2 Potential Screen Out.

In the mitigation mode, the controller 30 compares the fluid pressure to the maximum wellhead pressure (Step 552). When the fluid pressure is greater than a first preselected percentage of the maximum wellhead pressure, e.g., 90%, the controller 30 verifies that the blender screw conveyors 412 are not providing proppant to the blender unit 410, e.g., that the blender screw conveyors 412 are not rotating. If the blender screw conveyors 412 are providing proppant to the blender unit 410, the controller 30 stops the blender screw conveyors 412 to stop delivery of proppant (Step 554). When the delivery of proppant is stopped or verified to be stopped, the controller 30 begins to incrementally decrease a discharge rate of the fracturing pumps 200 as defined by process 560.

The process 560 may include multiple iterations of decreases in a discharge rate of the fracturing pumps 200 by a preselected increment (Step 562) and determining the fluid pressure increase rate (Step 564). The process 560 continues to iterate through Steps 562 and 564 until the fluid pressure increase rate is no longer increasing or stabilized, e.g., less than or equal to zero. The preselected increment may be in a range of 0.5 barrels per minute (BPM) to 10 BPM, e.g., 2 BPM. In some embodiments, the preselected increment is less than 5 BPM. The process 560 may include decreasing the discharge rate of the fracturing pumps 200 by the preselected increment (Step 562) and delaying the determining the fluid pressure increase rate (Step 564) for a period of time or a number of cycles of the fracturing pump 200, e.g., 1 second or 25 cycles or revolutions of the fracturing pump 200. The delay in determining the fluid pressure increase rate may allow for the fluid pressure to react to the decreased discharge rate before the fluid pressure increase rate is determined. During each iteration of the process 560, the controller 30 may sequence the flow rate of the blender unit 410 and the discharge rate of the fracturing pump 200. Specifically, the controller 30 may first send a control signal to the fracturing pump 200 to decrease a discharge rate of the fracturing pump 200 by the increment and then send a control signal to the blender unit 410, e.g., the discharge pump 418 of the blender unit 410, to decrease a flow rate of fluid to the fracturing pump 200. By sequencing the blender unit 410 and the fracturing pumps 200 cavitation at the fracturing pumps 200 may be avoided. In addition, by the controller 30 sequencing the blender unit 410 and the fracturing pumps 200, the need for an operator to manually sequence the blender unit 410 and the fracturing pumps 200 to maintain a safe operation state is removed.

When the fluid pressure increase rate is stabilized such that the fluid pressure is not increasing or is decreasing (e.g., equal to or less than zero), the controller 30 terminates the mitigation process 550 and maintains the discharge rate of the fracturing pumps 200 (Step 570). When the mitigation process 550 is completed, an operator may begin providing proppant to in the fluid provided to the fracturing pumps 200 by activating the blender screw conveyors 412 (Step 580) and/or may manually change the discharge rate of the fracturing pumps 200 (Step 582). When the operator takes control at Steps 580, 582, the operator may reactivate an automatic or scheduled program of the operation the controller 30 returns to monitoring the fluid pressure increase rate of Step 530.

Returning back to the entry into the mitigation process 550, when the fluid pressure increase rate is a Tier 3 Potential Screen Out and the fluid pressure is below or less than the first preselected percentage of the maximum fluid pressure, e.g., 90%, the controller 30 maintains the discharge rate of the fracturing pumps 200 and the delivery of the proppant (Step 556). When the discharge rate of the fracturing pumps 200 and the delivery of the proppant is maintained, an operator may provide input to the controller 30 to manually change the discharge rate of the fracturing pumps 200 or reactivate an automatic or scheduled program to the operation of the controller 30 (Step 582). If an operator does not intervene, the controller 30 continues to monitor fluid pressure.

If the operator does not intervene and the fluid pressure reaches a second preselected percentage of the maximum fluid pressure, e.g., 94%, the controller 30 intervenes by preparing for and running the process 560. Specifically, the controller 30 prepares for the process 560 by stopping the blender screw conveyors 412 to stop delivery of proppant (Step 554). When the delivery of proppant is stopped, the controller 30 begins the process 560 to incrementally decrease a discharge rate of the fracturing pumps 200 as detailed above until by cycling through Step 562 and Step 564 until the fluid pressure increase rate is no longer increasing or stabilized, e.g., less than or equal to zero. When the fluid pressure increase rate is stabilized, the discharge rate of the fracturing pumps 200 is maintained (Step 570) such that the mitigation process 550 is complete or terminated. When the mitigation process 550 is completed, an operator may begin providing proppant to in the fluid provided to the fracturing pumps 200 by activating the blender screw conveyors 412 (Step 580) and/or may manually change the discharge rate of the fracturing pumps 200 (Step 582). When the operator takes control at Steps 580, 582, the operator may reactivate an automatic or scheduled program of the operation the controller 30 returns to monitoring the fluid pressure increase rate of Step 530.

The mitigation process 550 enables the controller 30 to automatically stop delivery of proppant to the fluid provided to the fracturing pumps 200 and to decrease the discharge rate of the fracturing pumps 200 until the fluid pressure increase rate is stabilized without input from an operator. During the mitigation process 550, including the process 560, an operator may be prevented or locked out from certain commands of the controller 30. For example, in some embodiments, during the mitigation process 550, an operator may be locked out of all commands to the controller 30 except at step 556 until the mitigation process 550 concludes such that the fluid pressure increase rate has been stabilized. In certain embodiments, an operator may be locked out of increasing the discharge rate of the fracturing pumps 200 or initiating or increasing delivery of proppant during the mitigation process 550.

By reducing well screen out, the need for operations to reopen fractures or a well (e.g., wire line operations) may be reduced or eliminated such that time, and thus costs, to stimulate a well may be reduced. In addition, the method 500 of detecting and mitigating well screen out with a controller 30 may reduce rapid pressure increases associated with well screen outs such that stress on fracturing equipment may be reduced. The fracturing equipment may include, but not be limited to, fracturing pumps, power end assemblies of power units (e.g., gas turbine engines), gearboxes, transmissions, and piping or iron of the well site. Further, by intervening before the fluid supplied to the wellhead reaches the maximum fluid pressure, reliance on pressure relief valves, such as a wellhead pressure relief valve, may be reduced. Reducing reliance on pressure relief valves may conserve energy by not releasing pressure within the system and reduce stress on the fracturing equipment by maintaining a more consistent fluid pressure within the maximum wellhead pressure.

The method 500 being executed by the controller 30 allows for continuous monitoring of the fluid pressure and the fluid pressure increase rate at higher rate (e.g., 1 Hz to 300 Hz) when compared to relying on manual control and monitoring. In addition, by including multiple tiers of warnings (e.g., Tier 1 and Tier 2) the controller 30 alerts an operator to intervene before the fluid pressure approaches the maximum wellhead pressure and may automatically intervene if the fluid pressure increase rate reaches Tier 3 and the fluid pressure approaches the maximum wellhead pressure.

This is a continuation of U.S. Non-Provisional application Ser. No. 17/355,920, filed Jun. 23, 2021, titled "METHODS FOR DETECTION AND MITIGATION OF WELL SCREEN OUT," which is continuation of U.S. Non-Provisional application Ser. No. 17/303,841, filed Jun. 9, 2021, titled "METHODS AND SYSTEMS FOR DETECTION AND MITIGATION OF WELL SCREEN OUT," now U.S. Pat. No. 11,208,881, issued Dec. 28, 2021, which is a continuation of U.S. Non-Provisional application Ser. No. 17/182,408, filed Feb. 23, 2021, titled "METHODS FOR DETECTION AND MITIGATION OF WELL SCREEN OUT," now U.S. Pat. No. 11,066,915, issued Jul. 20, 2021, which claims priority to and the benefit of U.S. Provisional Application No. 62/705,050, filed Jun. 9, 2020, titled "METHODS AND SYSTEMS FOR DETECTION AND MITIGATION OF WELL SCREEN OUT," the disclosures of which are incorporated herein by reference in their entireties.

The foregoing description of the disclosure illustrates and describes various exemplary embodiments. Various additions, modifications, changes, etc., may be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed:

1. A method of detecting and mitigating well screen out at a fracturing well site, the method comprising:

operating one or more fracturing pumps to pump fluid to a wellhead at the fracturing well site;

sensing a fluid pressure of the fluid when supplied to the wellhead with one or more sensors;

measuring the fluid pressure of the fluid supplied to the wellhead; and in response to:

(i) a fluid pressure increase rate of the fluid supplied to the wellhead being greater than a preselected increase rate, and (ii) the fluid pressure of the fluid when supplied to the wellhead being greater than a preselected percentage of a selected maximum wellhead pressure:

decreasing incrementally, by a controller in communication with the one or more fracturing pumps and one or more blenders, a discharge rate of the one or more fracturing pumps and a flow rate of the fluid, the decreasing incrementally a discharge rate of the one or more fracturing pumps and a flow rate of the fluid including stopping delivery of the fluid prior to decreasing the discharge rate of the one or more fracturing pumps.

2. The method according to claim 1, further comprising determining, by the controller, when the fluid pressure increase rate is greater than the preselected increase rate before the pressure of the fluid provided to the wellhead is within the preselected percentage of the maximum wellhead pressure.

3. The method according to claim 1, wherein decreasing incrementally the discharge rate of the one or more fracturing pumps and the flow rate of the fluid by the controller includes decreasing the discharge rate of the one or more fracturing pumps prior to decreasing the flow rate of the fluid.

4. The method according to claim 1, further comprising resuming the addition of fluid supplied to the one or more fracturing pumps after fluid pressure is stabilized.

5. The method according to claim 1, further comprising terminating the detection and mitigation of well screen out in response to (a) the one or more fracturing pumps not operating in a pumping mode, or (b) one or more blenders not adding proppant to the fluid supplied to the one or more fracturing pumps.

6. A method of detecting and mitigating well screen out at a fracturing well site, the method comprising:

operating one or more pumps to pump fluid and proppant to a wellhead at the fracturing well site;

sensing a fluid pressure of the fluid supplied to the wellhead with one or more sensors;

measuring a fluid pressure of the fluid supplied to the wellhead by the one or more sensors at a location of one or more of:

(a) adjacent an output of the one or more fracturing pumps, or (b) at the wellhead, the one or more sensors each configured to measure a fluid pressure of the fluid provided to the wellhead;

and in response to:

(i) a fluid pressure increase rate of the fluid supplied to the wellhead being greater than a preselected increase rate, and (ii) the fluid pressure of the fluid supplied to the wellhead being greater than a preselected percentage of a selected maximum wellhead pressure:

decreasing incrementally, by a controller, a discharge rate of the one or more fracturing pumps and a flow rate of the fluid until the fluid pressure is stabilized.

7. The method according to claim 6, further comprising determining, by the controller, to provide an alert when the fluid pressure increase rate is greater than the preselected increase rate before the pressure of the fluid provided to the wellhead is within the preselected percentage of the selected maximum wellhead pressure.

8. The method according to claim 6, wherein decreasing incrementally the discharge rate of the one or more fracturing pumps and the flow rate of the fluid by the controller includes decreasing the discharge rate of the one or more fracturing pumps prior to decreasing the flow rate of the fluid.

9. The method according to claim 6, further comprising adding proppant to the fluid supplied to the one or more fracturing pumps after fluid pressure is stabilized.

10. The method according to claim 6, further comprising terminating the detection and mitigation of well screen out in response to (a) the one or more fracturing pumps not operating in a pumping mode, or (b) one or more blenders not adding proppant to the fluid supplied to the one or more fracturing pumps.

11. A method of detecting and mitigating well screen out at a fracturing well site, the method comprising:

operating one or more fracturing pumps to pump fluid and proppant to a wellhead at the fracturing well site; and controlling a discharge rate of the one or more fracturing pumps by a controller, the controller is:

calculating a fluid pressure increase rate of the fluid pressure;

comparing the fluid pressure increase rate of the fluid pressure to a preselected increase rate; and decreasing incrementally the discharge rate of the one or more fracturing pumps and a flow rate of the fluid when the fluid pressure increase rate is greater than the preselected increase rate and the fluid pressure is within a preselected percentage of a selected maximum wellhead pressure of the wellhead until the fluid pressure of the fluid supplied to the wellhead is stabilized, the decreasing incrementally a discharge rate of the one or more fracturing pumps and a flow rate of the fluid including stopping delivery of proppant to one or more blenders prior to decreasing the discharge rate of the one or more fracturing pumps.

12. The method according to claim 11, further comprising determining, by the controller, when the fluid pressure increase rate is greater than the preselected increase rate before the pressure of the fluid provided to the wellhead is within the preselected percentage of the selected maximum wellhead pressure.

13. The method according to claim 12, further comprising activating an alarm, by the controller, when the fluid pressure increase rate is greater than the preselected increase rate before the pressure of the fluid provided to the wellhead is within the preselected percentage of the selected maximum wellhead pressure.

14. The method according to claim 11, wherein decreasing incrementally the discharge rate of the one or more fracturing pumps and the flow rate of the fluid includes decreasing the discharge rate of the one or more fracturing pumps prior to decreasing the flow rate of the fluid.

15. The method according to claim 11, further comprising adding proppant to the fluid supplied to the one or more fracturing pumps after fluid pressure is stabilized.

16. The method according to claim 11, further comprising terminating the detection and mitigation of well screen out in response to: (a) the one or more fracturing pumps not operating in a pumping mode, or (b) the one or more blenders not adding proppant to the fluid supplied to the one or more fracturing pumps.

17. The method according to claim 11, further comprising, verifying, by the controller, the preselected percentage of the maximum wellhead pressure of the wellhead is within a preselected range of up to 15,000 per square inch (psi).

18. A method of detecting and mitigating well screen out at a fracturing well site, the method comprising:

operating one or more pumps to pump fluid and proppant to a wellhead at the fracturing well site;

sensing a fluid pressure of the fluid supplied to the wellhead with one or more sensors;

measuring a fluid pressure of the fluid supplied to the wellhead by the one or more sensors at a location of one or more of:

(a) adjacent an output of the one or more fracturing pumps, or (b) at the wellhead, the one or more sensors each configured to measure a fluid pressure of the fluid provided to the wellhead;

and in response to:

(i) a fluid pressure increase rate of the fluid supplied to the wellhead being greater than a preselected increase rate, and (ii) the fluid pressure of the fluid supplied to the wellhead being greater than a preselected percentage of a selected wellhead pressure:

decreasing incrementally, by one or more controllers, a discharge rate of the one or more fracturing pumps and a flow rate of the fluid until the fluid pressure is stabilized.

19. The method according to claim 18, further comprising determining, by the one or more controllers, to provide an alert when the fluid pressure increase rate is greater than the preselected increase rate before the pressure of the fluid provided to the wellhead is within the preselected percentage of the selected wellhead pressure.

20. The method according to claim 19, wherein decreasing incrementally the discharge rate of the one or more fracturing pumps and the flow rate of the fluid by the one or more controllers includes decreasing the discharge rate of the one or more fracturing pumps prior to decreasing the flow rate of the fluid.

21. The method according to claim 18, further comprising adding proppant to the fluid supplied to the one or more fracturing pumps after fluid pressure is stabilized.

22. The method according to claim 18, further comprising terminating the detection and mitigation of well screen out in response to (a) the one or more fracturing pumps not operating in a pumping mode, or (b) one or more blenders not adding proppant to the fluid supplied to the one or more fracturing pumps.

* * * * *